(12) United States Patent
Murphy et al.

(10) Patent No.: US 9,220,994 B2
(45) Date of Patent: Dec. 29, 2015

(54) CONSTRUCTION TOY

(71) Applicant: E&M Labs, Inc., Mountain View, CA (US)

(72) Inventors: Evan Murphy, Mountain View, CA (US); Michael Woods, Mountain View, CA (US); Marshall Grinstead, Sunnyvale, CA (US); Forrest Grinstead, Mountain View, CA (US)

(73) Assignee: E & M Labs, Inc., Mountain View, CA (US)

( * ) Notice: Subject to any disclaimer, the term of this patent is extended or adjusted under 35 U.S.C. 154(b) by 240 days.

(21) Appl. No.: 13/786,258

(22) Filed: Mar. 5, 2013

(65) Prior Publication Data

US 2013/0230353 A1 Sep. 5, 2013

Related U.S. Application Data

(60) Provisional application No. 61/634,679, filed on Mar. 5, 2012, provisional application No. 61/689,641, filed on Jun. 11, 2012.

(51) Int. Cl.
| | |
|---|---|
| *B25G 3/08* | (2006.01) |
| *E04G 7/00* | (2006.01) |
| *E06B 3/984* | (2006.01) |
| *A63H 33/10* | (2006.01) |
| *B23K 26/36* | (2014.01) |
| *A63F 1/04* | (2006.01) |
| *A63F 1/10* | (2006.01) |

(52) U.S. Cl.
CPC .............. *A63H 33/10* (2013.01); *A63H 33/105* (2013.01); *B23K 26/367* (2013.01); *A63F 1/04* (2013.01); *A63F 1/10* (2013.01); *Y10T 403/7096* (2015.01)

(58) Field of Classification Search
CPC ....... Y10T 403/7096; A63F 1/04; A63F 1/10; A63H 33/10; A63H 33/105; B23K 26/367
USPC ..... 403/375, 382; 24/67 R, 67.9, 130, 129 B, 24/563; 40/124.4, 605; 446/106, 124, 126; 248/309.1, 37.3, 37.6, 346.01, 346.03
See application file for complete search history.

(56) References Cited

U.S. PATENT DOCUMENTS

| | | | | |
|---|---|---|---|---|
| 3,537,706 | A | * | 11/1970 | Heavener, Jr. ................ 273/459 |
| 3,855,748 | A | * | 12/1974 | Thomas ......................... 52/578 |
| 3,940,100 | A | * | 2/1976 | Haug ......................... 248/188.1 |
| 4,625,966 | A | | 12/1986 | Sweet et al. |

(Continued)

OTHER PUBLICATIONS

International Search Report from PCT/US2013/045239, dated Feb. 27, 2014.

(Continued)

*Primary Examiner* — Gregory Binda
*Assistant Examiner* — Nahid Amiri
(74) *Attorney, Agent, or Firm* — Beyer Law Group LLP

(57) ABSTRACT

A card-holding component. The card-holding component comprises a main body that includes a base and a card-holding portion. The card-holding portion having a geometry of a segment of a circle with an arcuate edge. The card-holding component also comprises a multiplicity of peripheral slots arranged to open on the arcuate edge of the card-holding portion. Additionally, the card-holding component comprises a coupling notch having a width that substantially matches a thickness of the main body.

20 Claims, 33 Drawing Sheets

(56) References Cited

U.S. PATENT DOCUMENTS

| | | | | |
|---|---|---|---|---|
| 5,121,526 | A | * | 6/1992 | Burkard et al. .................. 24/336 |
| 5,901,859 | A | * | 5/1999 | Carr et al. ........................ 211/45 |
| 5,911,328 | A | * | 6/1999 | Shampo ........................... 211/40 |
| 6,149,487 | A | * | 11/2000 | Peng ............................... 446/114 |
| 6,389,652 | B1 | * | 5/2002 | Williams ................... 24/30.5 R |
| 6,552,270 | B1 | * | 4/2003 | Heacox ........................ 174/71 R |
| 6,557,278 | B1 | | 5/2003 | Huang et al. |
| D482,226 | S | * | 11/2003 | Bisiker et al. .................. D6/629 |
| D505,616 | S | * | 5/2005 | Wingerter et al. ............. D8/383 |
| 2002/0090881 | A1 | | 7/2002 | Turnham et al. |
| 2008/0252005 | A1 | | 10/2008 | Pincus et al. |
| 2012/0000059 | A1 | | 1/2012 | Fox et al. |

OTHER PUBLICATIONS

Written Opinion from PCT/US2013/045239, dated Feb. 27, 2014.

\* cited by examiner

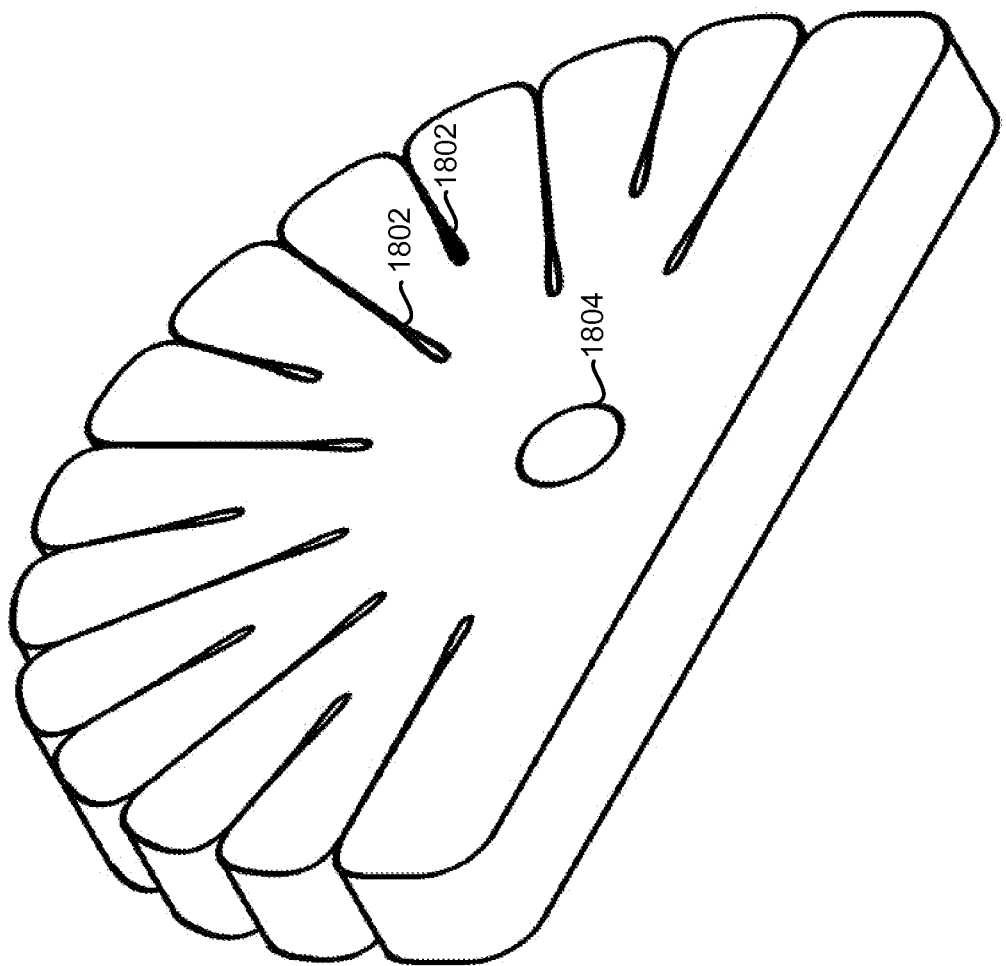

CONSTRUCTION TOY

CROSS-REFERENCE TO RELATED APPLICATIONS

This application claims benefit to U.S. Provisional Patent Application No. 61/634,679 filed Mar. 5, 2012 entitled "Method and Apparatus for Attaching Cards" and to U.S. Provisional Patent Application No. 61/689,641 filed Jun. 11, 2012 entitled "A Manufacturable Slot for Gripping Thin Planar Objects," both of which are incorporated herein by reference for all purposes.

BACKGROUND OF THE INVENTION

1. Field of the Invention

The present invention relates to card-holding components. In particular, the present invention relates to card-holding components that are designed to permit users to build three-dimensional objects using cards. Additionally, the card-holding components are compatible with each other so as to create complex objects. As such, models of houses, airplanes, and other items may be generated by connecting cards using card-holding components.

2. Background

The building of three-dimensional objects is instrumental to learning spacial relationships.

SUMMARY OF THE INVENTION

In one embodiment, a card-holding component is provided. The card-holding component comprises a main body that includes a base and a card-holding portion. Further, the card-holding portion has a geometry of a segment of a circle with an arcuate edge. The card-holding component also comprises a multiplicity of peripheral slots arranged to open on the arcuate edge of the card-holding portion. Additionally, the card-holding component also comprises a coupling notch having a width that substantially matches a thickness of the main body.

In another embodiment, a card-holding component is provided. In particular, the card-holding component comprises a main body that includes a card-holding portion having a semi-circular geometry with an arcuate peripheral edge and a generally rectangular base, the generally rectangular base having a side edge that faces away from the card holding portion. The card-holding component also comprises a multiplicity of peripheral card-holding slots having a tapered portion, the slots arranged to open on the arcuate peripheral edge of the card-holding portion, the card-holding slots being radially spaced at 15 degree intervals to define leafs between the slots, wherein each leaf is displaced into a space that forms a neighboring slot when a card is placed in a card-holding slot that defines the leaf, wherein a first set of the slots have a first length and a second set of the slots have a second length that is shorter than the first length, and wherein none of the slots is adjacent to a slot of the same length. Additionally, the card-holding component comprises a coupling notch that extends through the side edge into the base.

In a further embodiment, a method of forming a card-holding component is provided. In particular, the method comprises providing a main body having an edge that extends from a first point to a second point. The method also comprises forming slots along the edge of the main body, wherein each slot extends from the edge of the main body towards the center of the main body. Further, the method comprises forming a coupling notch within the disc, the coupling notch having a width that matches a thickness of the main body.

These and other features of the present invention will be described in more details below in the detailed description of the invention and in conjunction with the following figures.

BRIEF DESCRIPTION OF THE DRAWINGS

The present invention is illustrated by way of example, and not by way of limitation, in the figures of the accompanying drawings and in which like reference numerals refer to similar elements and in which:

FIGS. 18A and 18B illustrate a front view and a perspective view, respectively, of a semi-circular kinetic card-holding component shaped having a circular hole in accordance with embodiments of the present invention.

DETAILED DESCRIPTION OF THE PREFERRED EMBODIMENTS

Figure 1:
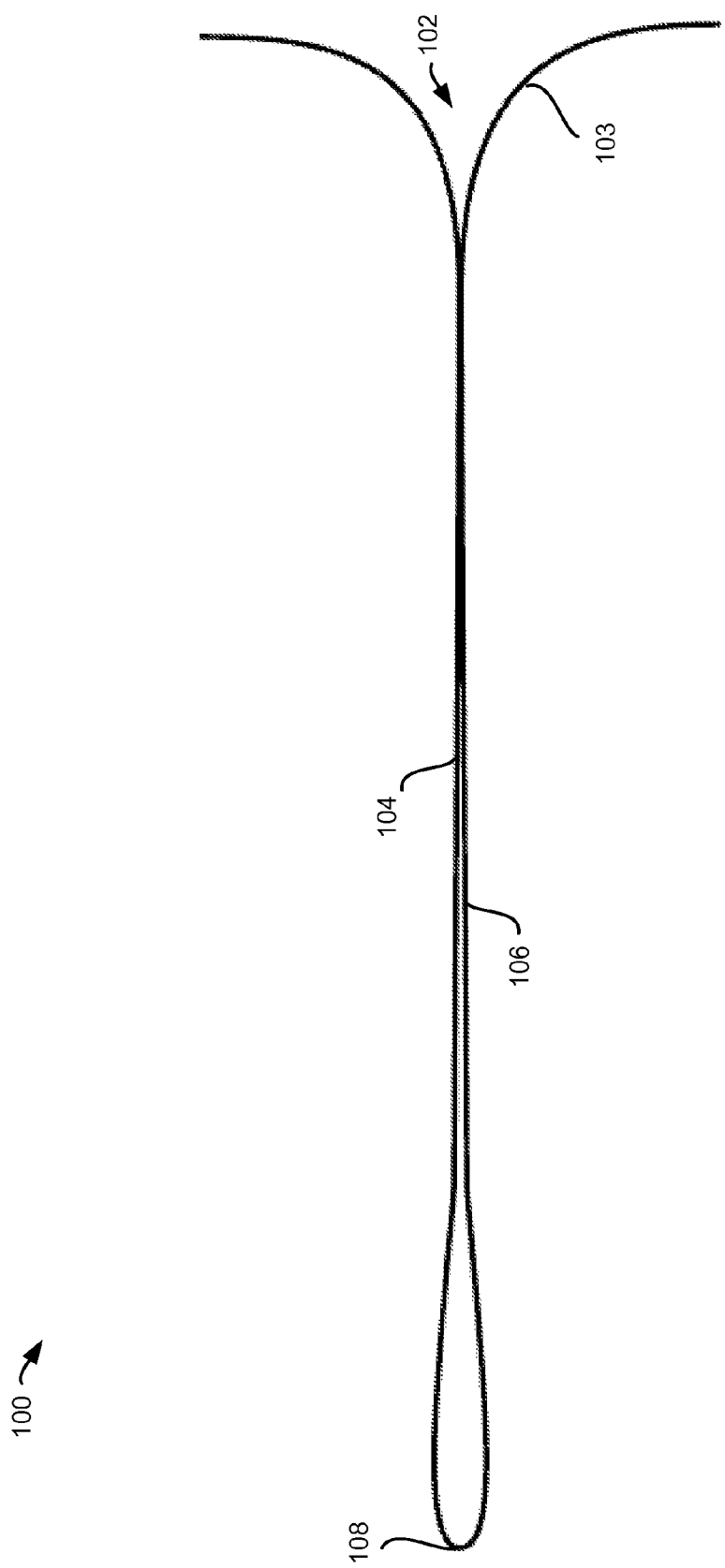
FIG. 1 illustrates a front view of a slot used within a card-holding component, in accordance with embodiments of the present invention.

The present disclosure will now be described in detail with reference to a few preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

The present invention includes card-holding components that attach to planar objects, such as cards. Card-holding components may be clips. As such, card-holding components may grasp, clamp, or grip planar objects. Further, card-holding components may also embody other methods of securing planar objects. Planar objects may be folded, cut, or otherwise modified to form part of configurations using the card-holding components. For example, a planar object may refer to a folded playing card that has a planar component that engages with a card-holding component. In particular, card-holding components attach to cards to form different static and/or movable shapes and/or structures. In this application, a card may be a playing card, a piece of thick paper, fabric (typically stiffened), cardboard, plastic, wood, thin metal sheets, or other materials. To form different structures, card-holding components of different embodiments may be interconnected with one another and/or connected to cards in different configurations.

As discussed herein, card-holding components are formed in generally two ways: through the use of laser cutting and through the use of injection molding. By using a laser cutter, a card-holding component may be formed from a single disc. Card-holding components may also be formed from bodies that are in the shape of a circle, semi-circle, square, rectangle, or another form of shape. Further, slots and notches may be formed in a portion of a wooden disc using a laser cutter. In particular, a disc is a type of a main body that may be used to form a card-holding component. Additionally, the term "disc" may be generally used to describe at type of body that is a disc or a portion of a disc. In further embodiments, bodies may be formed from other materials, such as acrylic, cardboard, paperboard, Delrin®, medium-density fiberboard, other plastics, etc. Bodies may also be formed from composites of one or more of these materials.

Additionally, slots may be formed in bodies using additionally manufacturing processes. For example, slots may be formed using subtractive manufacturing processes based on the kerf thickness of the process. In particular, subtractive manufacturing processes include processes that remove a portion of the material that is grabbed for cutting. As such, if the thickness of the material that is lost due to the process, i.e. the kerf thickness, is greater than the thickness of the material available to be grabbed, then the process would not be appropriate for the formation of slots. Accordingly, subtractive manufacturing processes that may be used include laser cutting, water jet cutters, saw blades, and a wire EDM machine, as some examples, so long as the desired slot thickness and availability of material is commensurate with the kerf thickness of the proposed process of cutting. Further, bodies having slots may also be formed using additive manufacturing processes, such as the creation of bodies having slots using 3-D printers.

FIGS. 1-7B illustrate embodiments of single-disc card-holding components, such as those created using a laser cutter. FIG. 1 illustrates a front view of a slot used within a card-holding component, in accordance with embodiments of the present invention. In particular, FIG. 1 illustrates an embodiment of a tapered slot 100 that is usable to hold a card approximately 0.012 inches thick. An example a card of this dimension is a standard playing card, such as those sold by Cartamundi™ USA or Bicycle® Playing Cards. Cards that are approximately 0.01 inches thick +/−0.005 inches may also be used. Further, tapered slot 100 has a minimum width of 0.002 or 0.003 inches to hold the card. In particular, a card may be inserted into slot 100 by passing the card through entrance opening 102 such that the card is inserted in a way that is substantially perpendicular to the page. In alternative embodiments, a portion of a playing card may be inserted into a left side (not visible) or right side (not visible) of the slot and then fully placed into the slot by rotating the playing card to pass through the entrance opening 102.

As such, when the card is held within tapered slot 100, it is held in place using an interference fit. An interference fit is used when the dimensions of an inner object (in this example, the card) are greater than the dimensions of an outer object (in this example, tapered slot 100) and yet the inner object fits completely within the outer object. In particular, the dimensions of the inner object compress and/or the dimensions of the outer object expand so as to allow the inner object to fit within the outer object. Accordingly, the dimensions of tapered slot 100 may be adjusted to allow for objects commensurate with the compressibility of the inner object and the expansion of the outer object to complete an interference fit. Preferably, the interference fit between the inner object and the outer object in embodiments described herein would be adjusted so as to not damage the inner object or the outer object.

As shown in FIG. 1, tapered slot 100 has two sidewalls, a top sidewall 104 and a bottom sidewall 106. Top sidewall 104 and bottom sidewall 106 are symmetrical, meeting at a curved bottom 108 and coming closest together at entrance opening 102. This allows the card to be held more tightly in place. In alternative embodiments, sidewalls 104 and 106 may be substantially symmetrical, wherein a difference of one or two ten thousands of an inch may be seen between sidewalls 104 and 106, but such difference would not be enough to limit the functionality of the tapered slot for purposes of claimed embodiments of the preset invention. Additionally, corners 103 of entrance opening 102 may be curved so as to improve the ability for a card to enter slot 100.

Accordingly, sidewalls 104 and 106 of slot 100 are configured to hold a card. In embodiments, sidewalls 104 and 106 are configured so as to minimize damage to a card. In one embodiment, the beginning and the middle section of tapered slot 100 have a tapered profile. In particular, sidewalls 104 and 106 are tapered as they approach entrance opening 102 to provide greater pressure against a card. In this way, the portions of sidewalls 104 and 106 that are near entrance opening 102 pinch the card relatively tight, and guide the card down tapered slot 100. Further, sidewalls 104 and 106 may be designed so that when the card is inserted into tapered slot 100, the card forces both sidewalls 104 and 106 slightly apart. In one embodiment, with the card inserted, sidewalls 104 and 106 of tapered slot 100 may distort to become substantially parallel so as to hold the card along a more extended contact area of sidewalls 104 and 106. Other embodiments of tapered slot 100 may have sidewalls 104 and 106 in other shapes, such as a slot having sidewalls 104 and/or 106 with a straight profile instead of a tapered profile, a slot having sidewalls 104 and/or 106 with saw-tooth patterns, or a slot having sidewalls 104 and/or 106 with wavelike structures. As such, a slot, such as tapered slot 100, may have sidewalls 104 and 106 that are shaped in a piecewise-differentiable fashion so long as sidewalls 104 and 106 are still able to securely hold a card in a card-holding component.

As seen in FIG. 1, the base of tapered slot 100 may be widened with a rounded end, such as curved bottom 108. Typically, when a user inserts a card into tapered slot 100, the presence of the card tends to force sidewalls 104 and 106 of tapered slot 100 apart, which may generate stress in the material of the card-holding component. The stress may be concentrated at or close to the base of tapered slot 100. Curved bottom 108 at the base of tapered slot 100 may minimize the effect of this stress. Curved bottom 108 with a teardrop shape, as shown in FIG. 1, serves as one example. Alternatively, instead of a teardrop shape, the base of tapered slot 100 may be more abrupt or may have other shapes, such as a circular arc or a square with a rounded end, in different embodiments.

In one embodiment, tapering slot 100 may have dimensions such that the thinnest point of the tapering slot 100 is between 0.004 inches and 0.008 inches wide. A middle portion of tapering slot 100 may be between 0.01 inches and 0.015 inches wide, and the curved bottom 108 may be between 0.025 inches to 0.04 inches wide. The length of tapering slot 100 from entrance opening 102 to curved bottom 108 may be between 0.2 and 0.25 inches long for the shorter slots and between 0.35 and 0.40 inches long for the longer slots in the staggered pattern described above.

Figure 2:
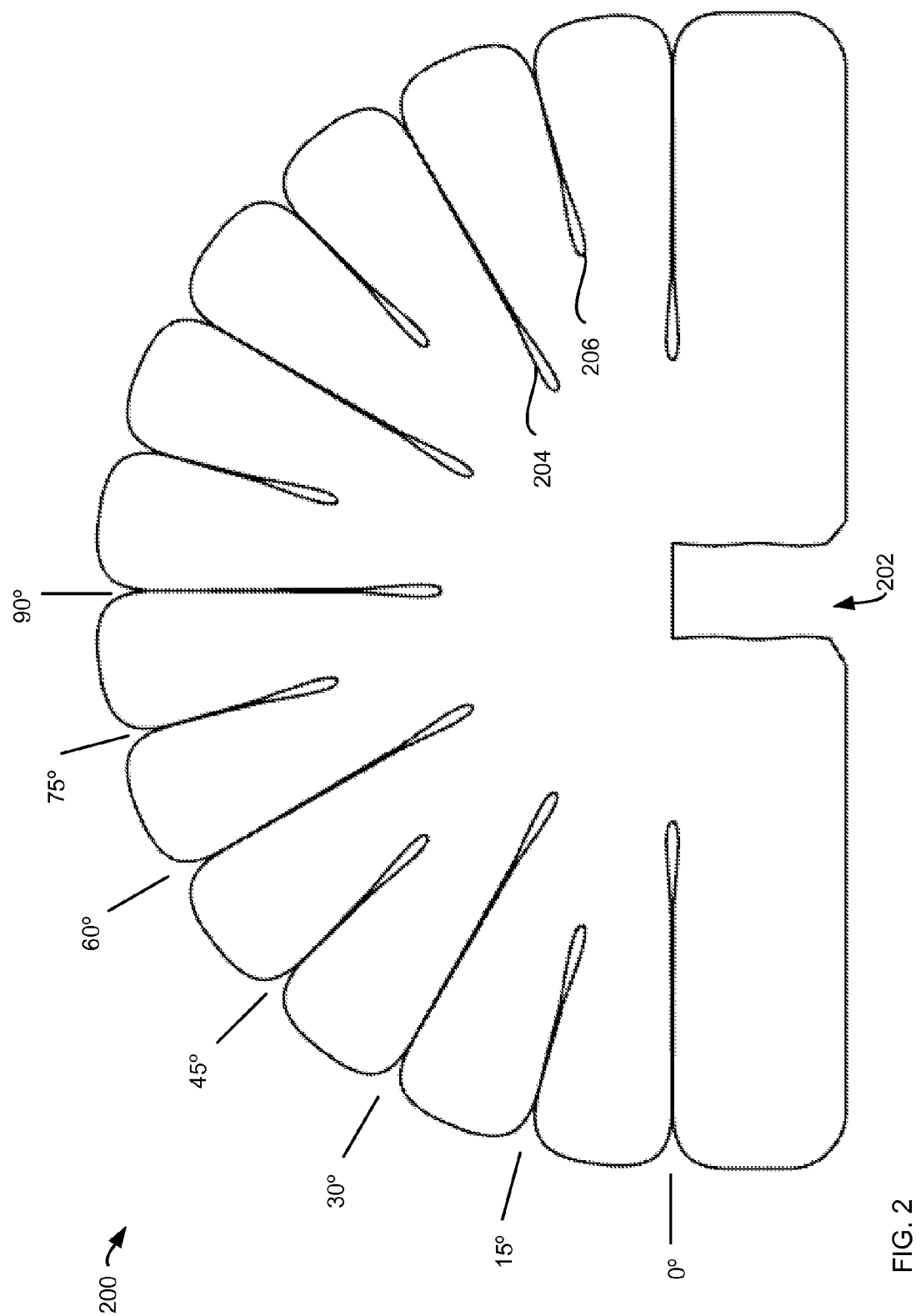
FIG. 2 illustrates a front view of a card-holding component, in accordance with embodiments of the present invention.

FIG. 2 illustrates a front view of a card-holding component 200, in accordance with embodiments of the present invention. FIG. 2 shows a notch 202 and multiple slots. In particular, FIG. 2 shows the angular off-set of multiple slots, such as slots 204 and 206, within a card-holding component. The slots as shown in FIG. 2 are off-set at 15 degree intervals. As such, the multiple slots are in relatively close proximity to one another. In this embodiment, the slots are staggered to allow a larger region of material to fall between the ends of neighboring slots. In particular, the slots are staggered at a first length, as seen in slot 204, and second length, as seen in slot 206. This allows a larger region of material between the ends of two neighboring slots, which may be physically stronger than a smaller region of material that would exist if the ends of all of the slots lay on the same circle. By staggering the positions of the ends of the slots, this embodiment may increase the physical strength of the card-holding components. FIG. 2 shows one example of placements of slots in a card-holding component. In other embodiments, slots may be spaced apart at different angles and the ends of the slots may be staggered differently also, such as slots every 22.5 degrees, or slots with a larger ratio between longer and shorter slots, to increase the staggering effect. Additionally, the portion of the card-holding component that contains slots may be referred to as the card-holding portion.

Figure 3:
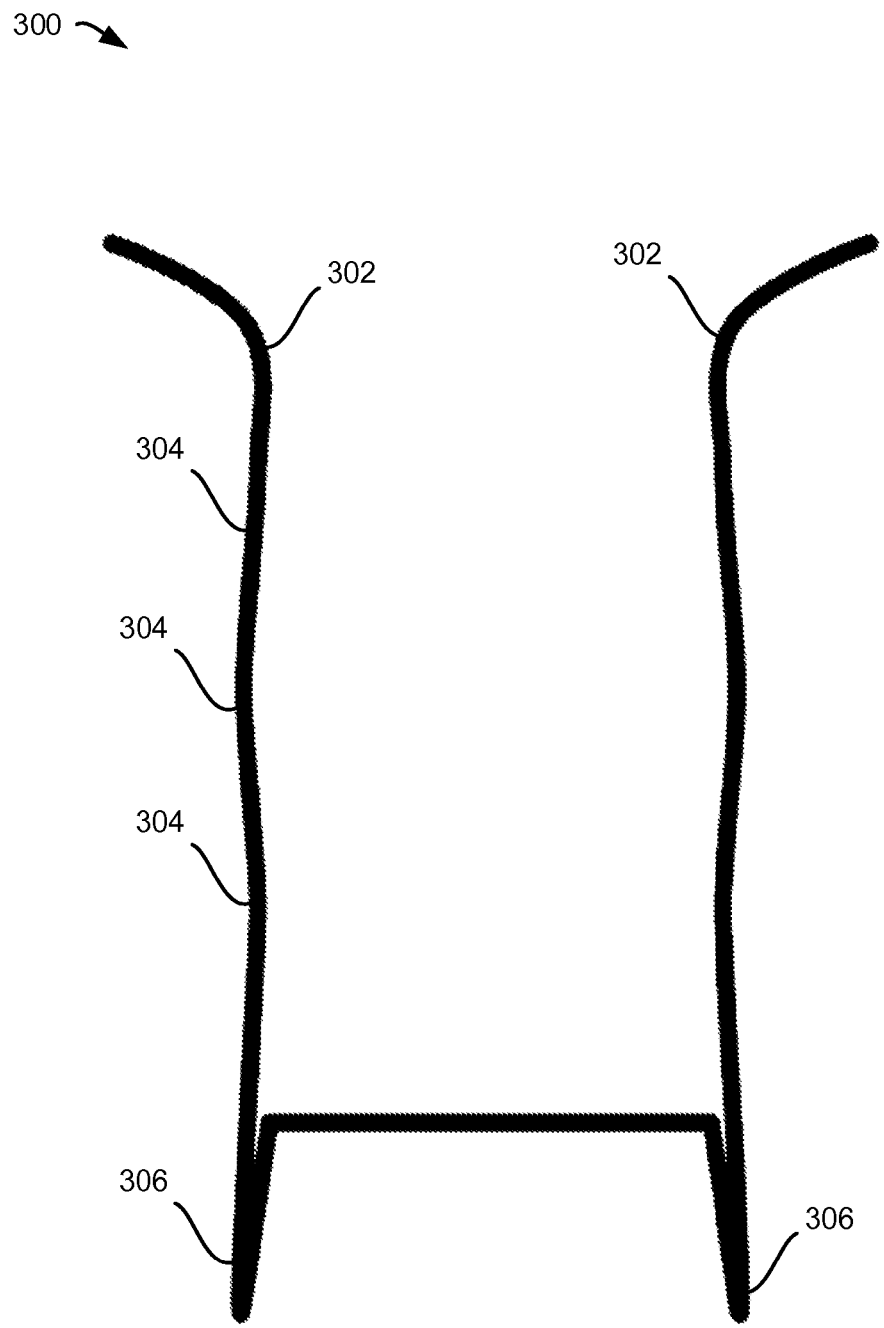
FIG. 3 illustrates a view of a notch used within a card-holding component, in accordance with embodiments of the present invention.

In embodiments, a card-holding component may be connected or attached to a piece of material of a certain predetermined width through a notch cut in the material of the card-holding component. In particular, a notch may be formed in a base portion of a card-holding component. An example of notch 202 is shown in FIG. 2, while FIG. 3 shows an embodiment of a close-up view of notch 300. Accordingly, FIG. 3 illustrates a view of a notch used within a card-holding component, in accordance with embodiments of the present invention.

As seen in FIG. 3, the width of notch 300 is compatible with the thickness of card-holding component material of a compatible card-holding component. Such a thickness enables two card-holding components that have compatible dimensions to be joined with the notch on a first card-holding component fitting through the notch on a second card-holding component. In particular, the first card-holding component and second card-holding component are fit together using an interference fit, with each notch extending into the main body of the other card-holding component. When the notch of a first card-holding component is fit within the notch of a second card-holding component, the plane of the first card-holding component is oriented substantially perpendicular to the plane of the second card-holding component. In alternative embodiments, the angle of at least one notch may be designed so as to orient card-holding components at different angles that are not substantially perpendicular. For example, notches may be angled to result in an orientation of a card-holding component at 30 degrees, 45 degrees, 60 degrees, etc. Further, edges 302 of the notch 300 have rounded corners, similar to rounding the corners of the entrance opening 102 of a slot 100 as seen in FIG. 1. The rounded corners 302 may help guide attachment of card-holding components.

In one embodiment, the sides of a notch 300 are cut with one or more rounded curves 304. For example, the width at the thinnest point of the notch 300 may be approximately 95% of the thickness of the material pieces to be inserted, and the width at the widest point of the notch 300 may be approximately 99% of the thickness of the material pieces to be inserted. These curves may then compress slightly if the material in which the card-holding component is made is compressible (such as wood, paper, or many different types of plastics). The amount of compression may be correlated to the curves in the sides 304. As the material in the curve is compressed more, the card-holding component material may apply more pressure to the material inserted, further helping to hold the inserted material in place.

Notch 300 may also include slits 306 at the bottom corners of notch 300. With slits 306, the material to the left and right of the notch may be pressed more outward by the inserted material. In particular, stress that is generated when a card-holding component is inserted into notch 300 may spread over a greater area due to the expansion of slits 306. As such, slits 306 at the bottom corners of notch 300 allow the material of the card-holding component on either side of notch 300 to be pushed outward without putting undue strain on the material of the card-holding component. The card-holding component material typically also resists this outward push, causing more pressure to be applied to the inserted material, such as a card.

Different embodiments of notch 300 described above help provide additional pressure on a piece of material inserted into notch 300. Then the inserted material may be better gripped by the corresponding card-holding component. In this manner, the card-holding component may be securely attached to another piece of material, which may be another card-holding component, by hand-pressing the material into notch 300. In additional embodiments, an edge of a card-holding component may be placed within a notch such as notch 300. As such, the portion of the card-holding component that is inserted into notch 300 may vary based on the alignment of the card-holding component.

Figure 4:
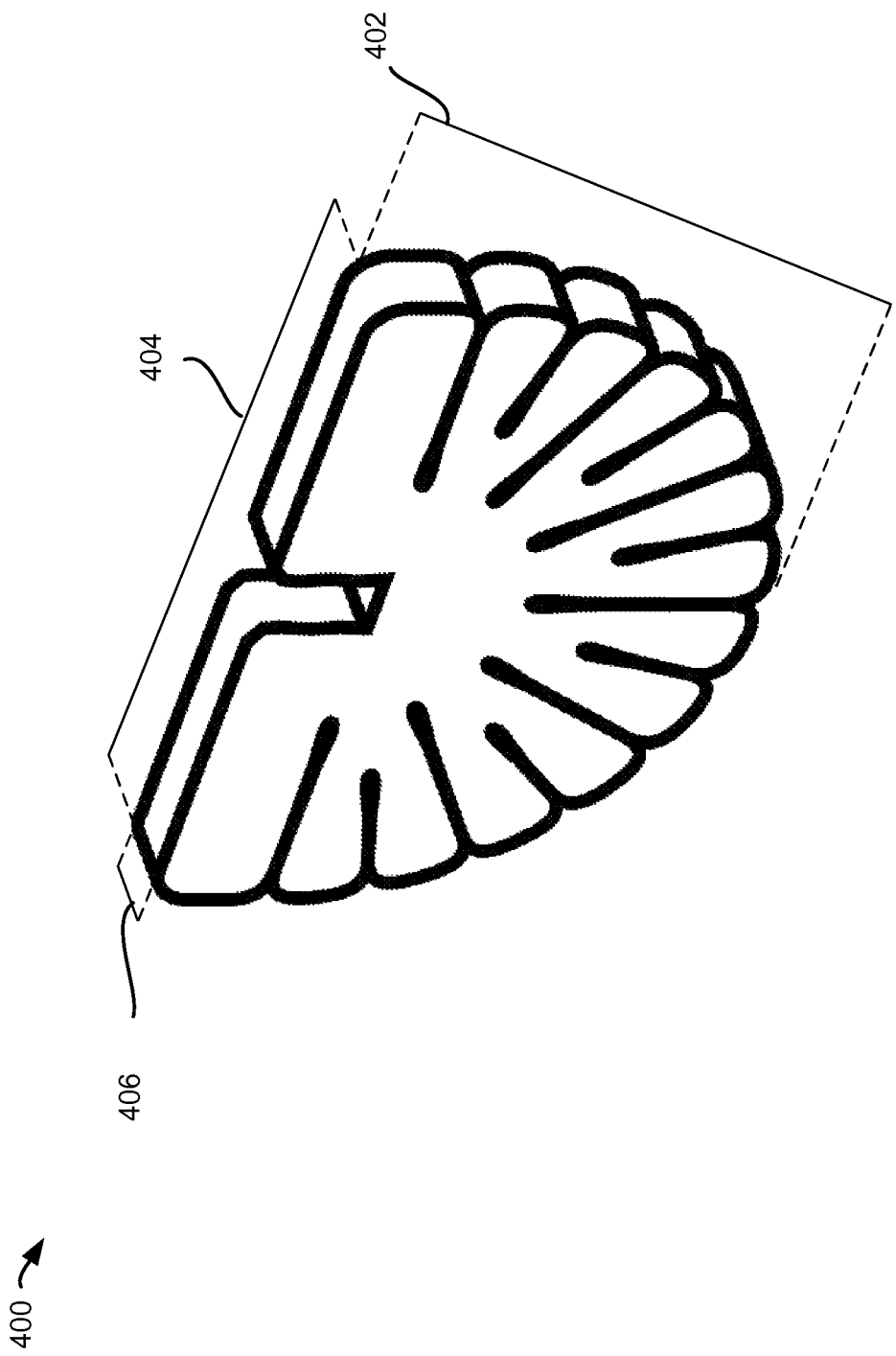
FIG. 4 illustrates a perspective view of a card-holding component in accordance with embodiments of the present invention.

FIG. 4 illustrates a perspective view of a card-holding component 400 in accordance with embodiments of the present invention. In particular, FIG. 4 shows one embodiment where card-holding component 400 may have a height 402 between 0.6 inches and 1.0 inches, a width 404 between 1.0 inch and 1.5 inches, and a thickness 406 between 0.06 inches and 0.2 inches. This embodiment may be suitable for use with playing cards, business cards, or other heavy paper or card stock.

Figure 5:
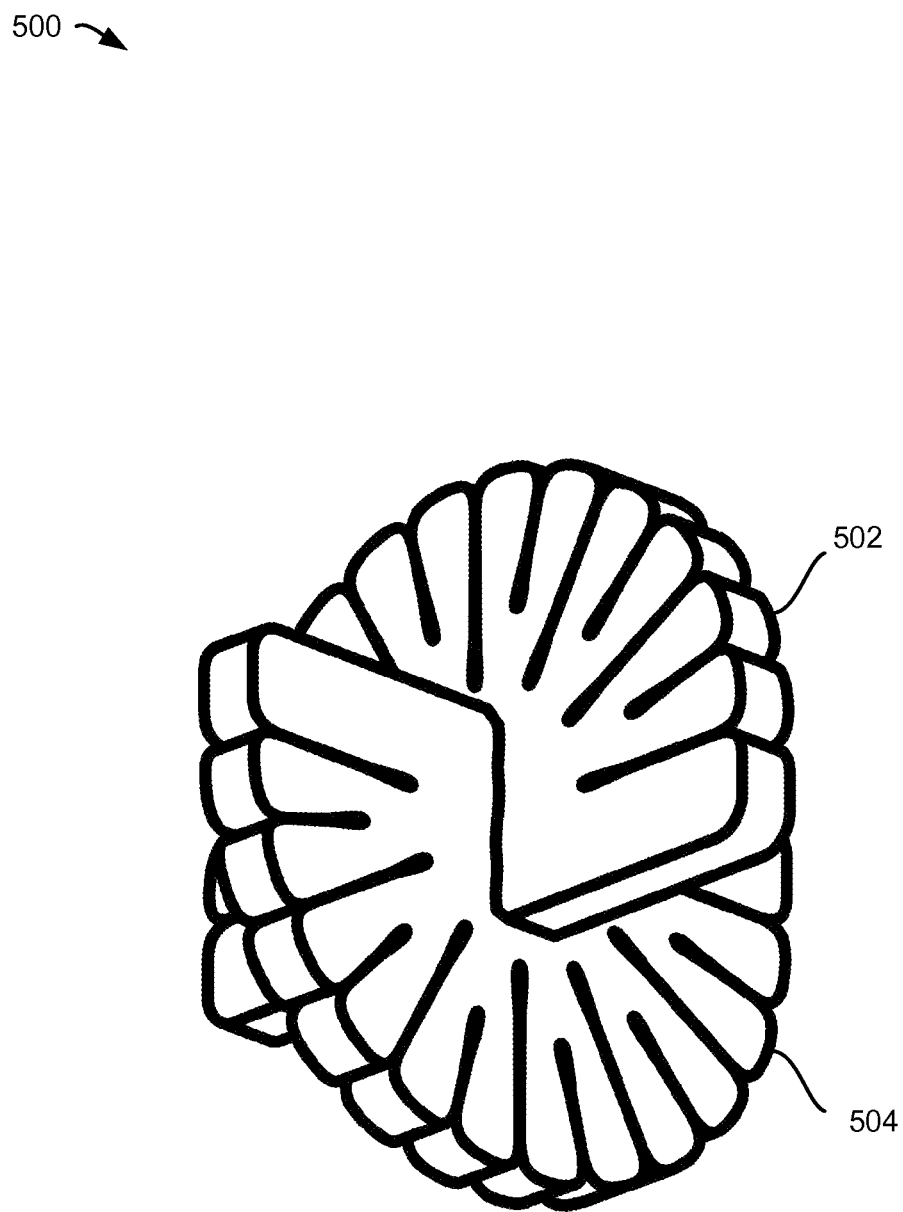
FIG. 5 illustrates a perspective view of two attached card-holding components in accordance with embodiments of the present invention.

FIG. 5 illustrates a perspective view 500 of two attached card-holding components in accordance with embodiments of the present invention. In particular, FIG. 5 shows one configuration where two card-holding components 502 and 504 have been connected together in a substantially perpendicular configuration via their notches. As shown in FIG. 5, a portion of a first card-holding component 502 has transgressed the length of the notch of a second card-holding component 504. Accordingly, the notch and width of each card-holding component 502 and 504 are compatible so as to securely stay in place when fitted together. In another embodiment, second card-holding component 504 may be rotated 180-degrees so as to have the notch of first card-holding component 502 attach to the edge of second card-holding component, the notch of first card-holding component 502 encompassing the edge of second card-holding component 504. For example, the notch of first card-holding component 502 may attach to a location along the arcuate edge of second card-holding component 504. Additionally, different configurations may be used to attach card-holding components together and/or to attach card-holding components to cards according to different embodiments of the invention.

Figure 6:
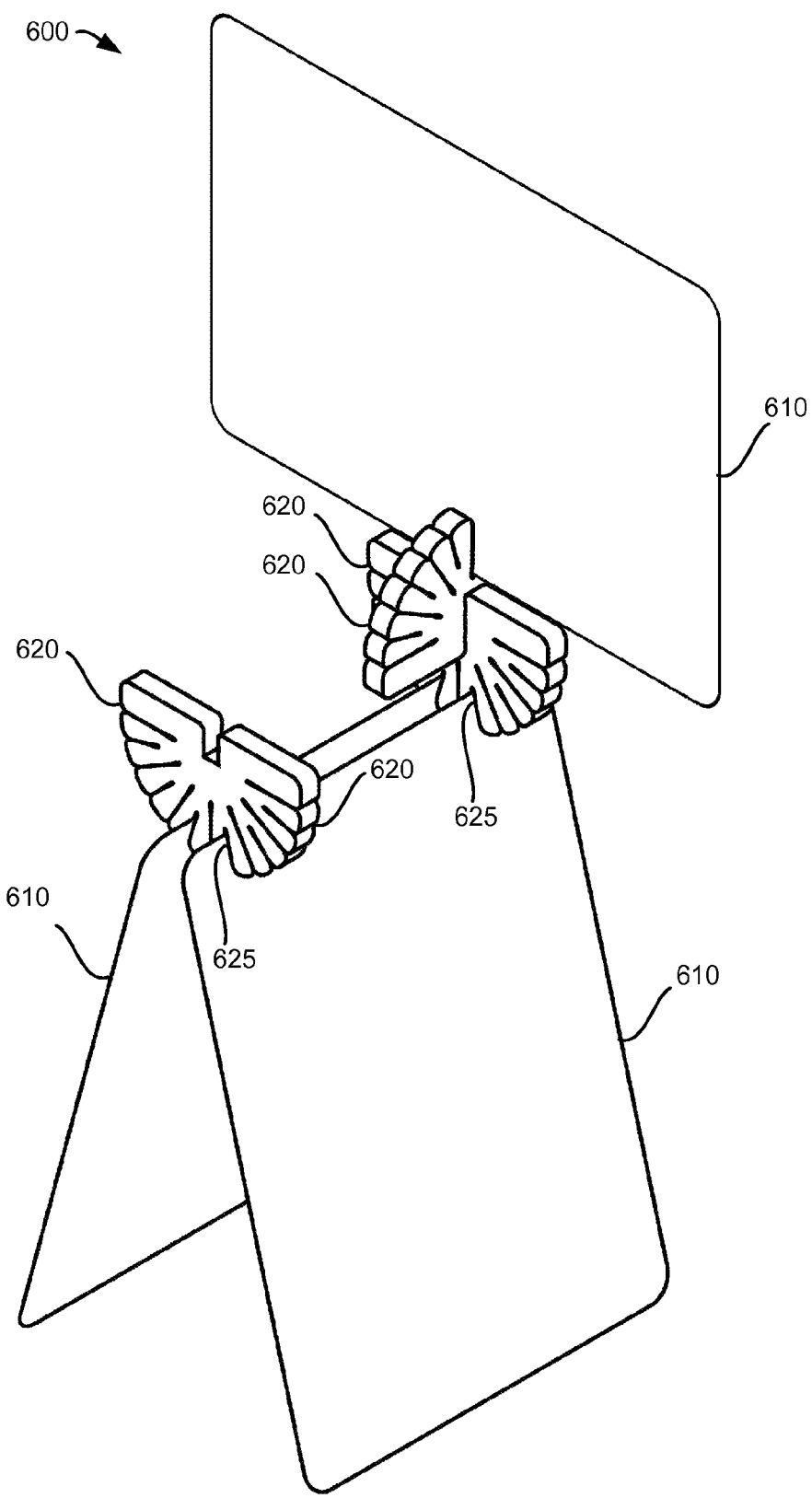
FIG. 6 illustrates a perspective view of three card-holding components situated to hold a configuration of cards in accordance with embodiments of the present invention.

Accordingly, FIG. 6 shows an example configuration attaching three card-holding components to three cards. In particular, FIG. 6 illustrates a perspective view of three card-holding components situated to hold a configuration 600 of cards in accordance with embodiments of the present invention. As seen in FIG. 6, several cards 610 and several card-holding components 620 are connected together by securing cards 610 in slots 625 of card-holding components 620.

Figure 7B:
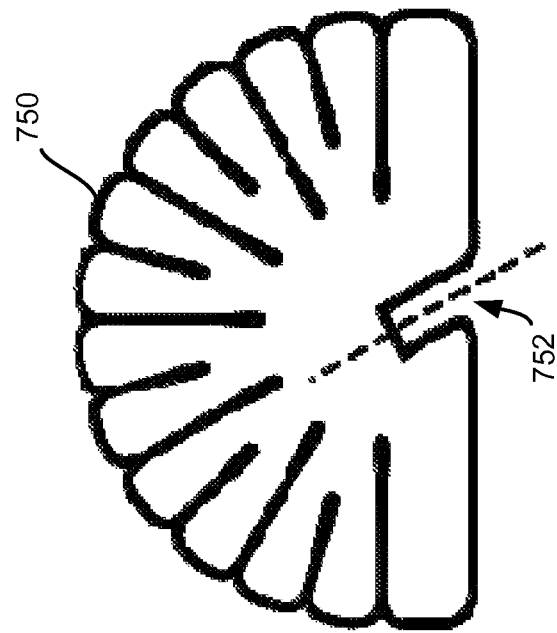
FIG. 7B illustrates a perspective view of a card-holding component having a notch that is rotated in the plane of the card-holding component in accordance with embodiments of the present invention.
Figure 7A:
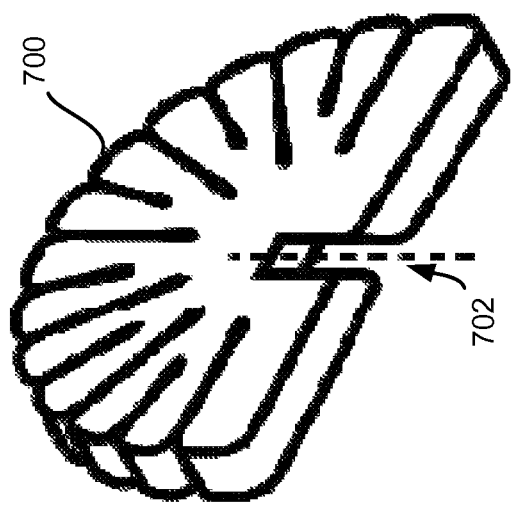
FIG. 7A illustrates a front view of a card-holding component having a notch that is rotated in the axis of the card-holding component in accordance with embodiments of the present invention.

Notches on a card-holding component may have many orientations relative to the form of the card-holding components. For example, notches such as notch 202 and notch 300 of FIGS. 2 and 3, respectively, are substantially perpendicular to the plane of the face of their respective card-holding component. However, notches may also be non-perpendicular with respect to the plane of the face of their card-holding component. For example, FIG. 7A illustrates a front view of a card-holding component 700 having a notch 702 that is rotated in the axis of the card-holding component in accordance with embodiments of the present invention. In particular, the angle of notch 702 is illustrated by a dashed line that is at an acute angle with respect to the face of component 700. Additionally, FIG. 7B illustrates a perspective view of a card-holding component 750 having a notch 752 that is rotated in the plane of the card-holding component in accordance with embodiments of the present invention. In particular, the angle of notch 752 is illustrated by a dashed line that is at an acute angle with respect to the edge of component 750. This or other placements of the notches may allow the card-holding components to be connected to each other or to other card-holding components at a variety of angles.

In addition to the processes described above, card-holding components may also be formed through the use of injection molding. However, in these applications, a novel multi-disc approach is used so as to take advantage of the benefits of injection molding. In particular, the use of injection molding allows card-holding components to be easily mass-produced. However, current methods of injection molding do not allow for slots as narrow as two thousandths of an inch to be formed in a single disc. As such, a multi-disc approach is disclosed which allows for slots as narrow as two thousands of an inch to be formed by aligning at least two components, with each component originating from an independent disc.

Accordingly, FIGS. 8-16 illustrate embodiments of multi-disc card-holding components, such as those created using injection molding. A card-holding component that is formed using injection molding creates slots that are 0.002 inches wide at their narrowest point. However, these slots are not formed directly—rather, they are formed by aligning at least two layers having wider slots to create a narrower slot having contributing components from each layer. Accordingly, an embodiment of a card-holding component formed via injection molding is formed using a combination of two or more layers, each layer containing its own slot formed from injection molding. In particular, in an embodiment having two layers, each layer comprises slots between 0.02-0.03 inches wide. These two slots are then aligned with respect to each other so as to form a resulting, narrower slot that is 0.002 inches wide at its narrowest point. In further embodiments, however, slots may be widened so as to adjust for alternative thicknesses of cards.

Figure 8:
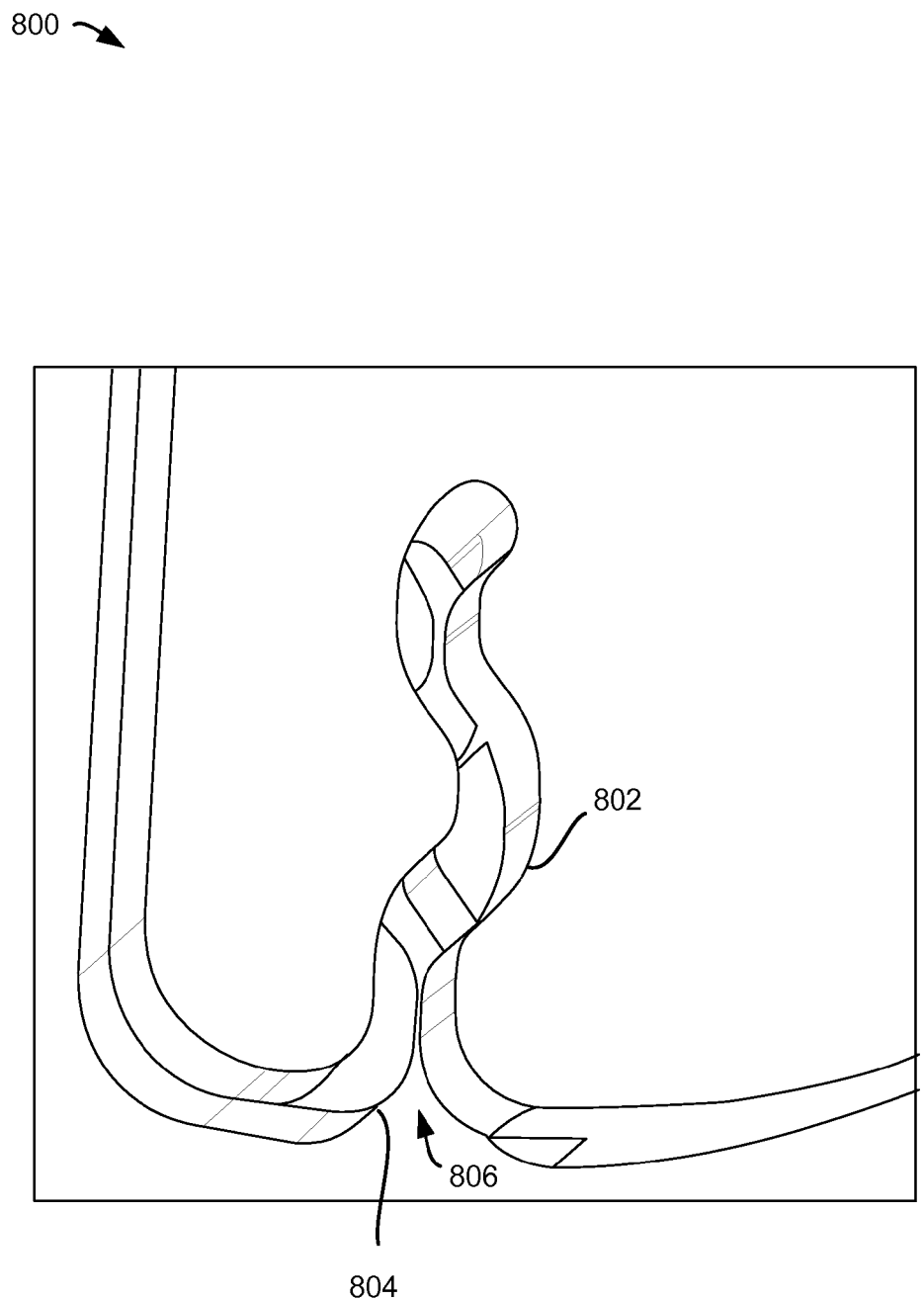
FIG. 8 illustrates a perspective view of a portion of a two-layer card-holding component in accordance with embodiments of the present invention.

Accordingly, FIG. 8 illustrates a perspective view of a portion of a two-layer card-holding component 800 in accordance with embodiments of the present invention. In particular, FIG. 8 shows first disc 802 aligned with second disc 804. As seen in FIG. 8, both first disc 802 and second disc 804 have gaps that are formed by walls in the shape of sine waves. When first disc 802 and second disc 804 are aligned correctly, a narrow slot 806 is formed in the space that results between the overlap of discs 802 and 804.

Figure 9A:
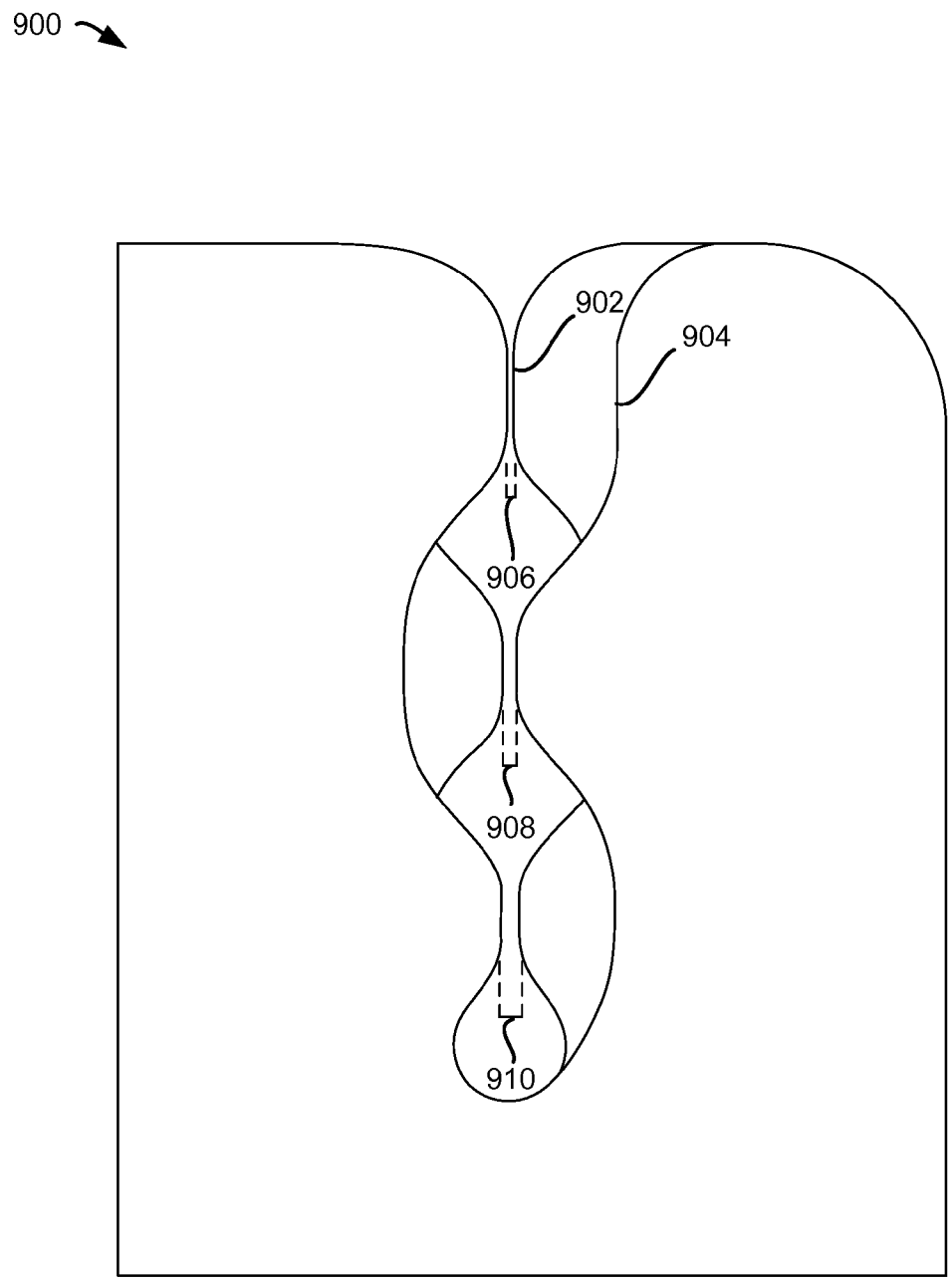
FIGS. 9A and 9B illustrate a front view and a rear view of a portion of a two-layer card-holding component in accordance with embodiments of the present invention.
Figure 9B:
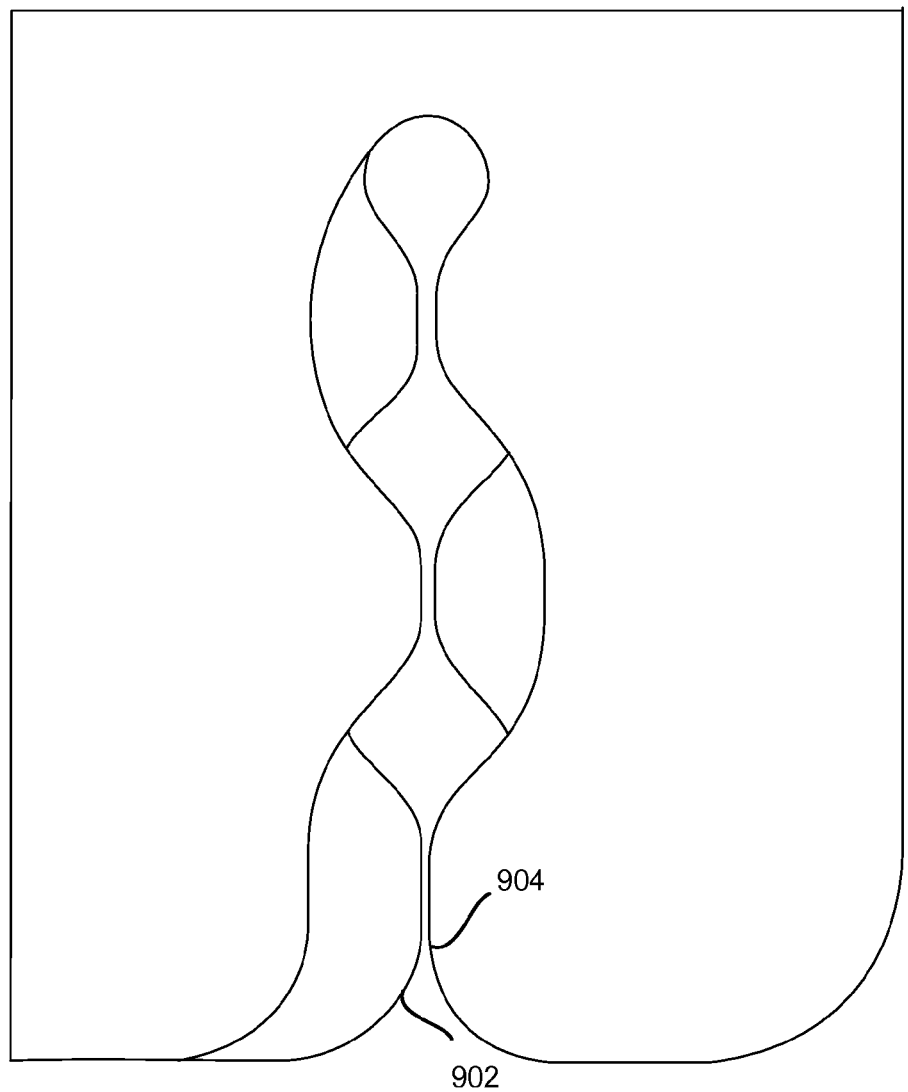

FIGS. 9A and 9B illustrate a front view and a rear view of a portion of a two-layer card-holding component in accordance with embodiments of the present invention. In particular, first disc 902 and second disc 904 overlap to create a narrow slot that is bounded by curves of a slot within discs 902 and 904. In particular, FIG. 9A shows first disc 902 aligned with second disc 904. As seen in FIG. 9A, both first disc 902 and second disc 904 have gaps that are formed by walls in the shape of sine waves. In particular, curves narrow to form gaps 906, 908, and 910. As seen in FIG. 9A, the width of the gaps taper towards the edge of the two-layer card-holding component. As such, gap 910 is slightly wider than gap 908, which in turn is slightly wider than gap 906. Accordingly, the shapes of the component slots from first disc 902 and second disc 904 have layers and their positions relative to each other create an overall slot capable of tightly gripping a planar object, such as a card, within a specified thickness range. Further, FIG. 9B illustrates a rear view of a portion of a two-layer card-holding component as shown in FIG. 9A in accordance with embodiments of the present invention. In particular, FIG. 9B shows first disc 902 aligned with second disc 904.

Figure 10:
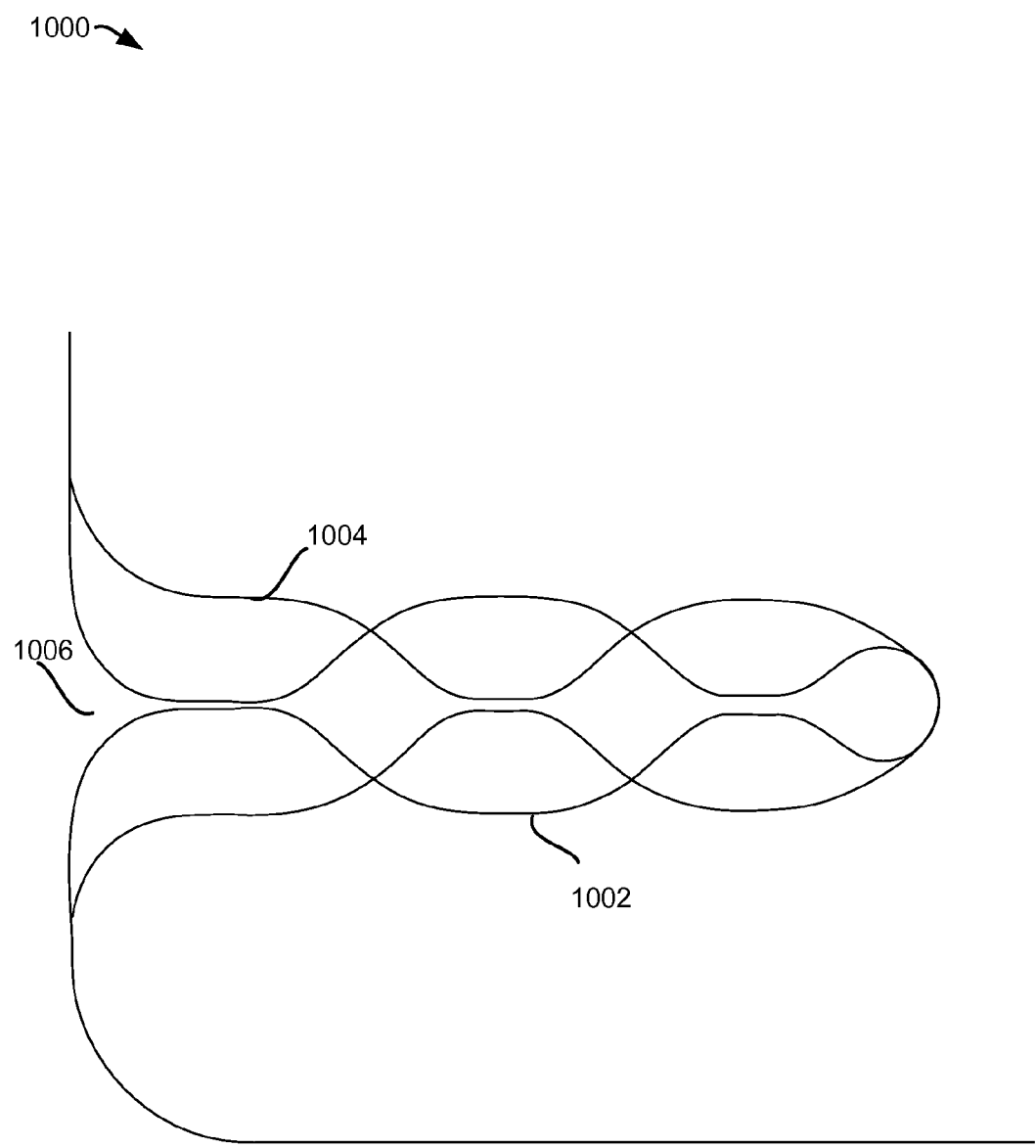
FIG. 10 illustrates a wire frame rear view of a portion of a two-layer card-holding component in accordance with embodiments of the present invention.

FIG. 10 illustrates a wire frame rear view of a portion 1000 of a two-layer card-holding component in accordance with embodiments of the present invention. In particular, FIG. 10 illustrates an entire shape of a slot within first disc 1002 and an entire shape of a slot within second disc 1004. When first disc 1002 and second disc 1004 are aligned, a resultant narrower slot 1006 is formed.

Figure 11:
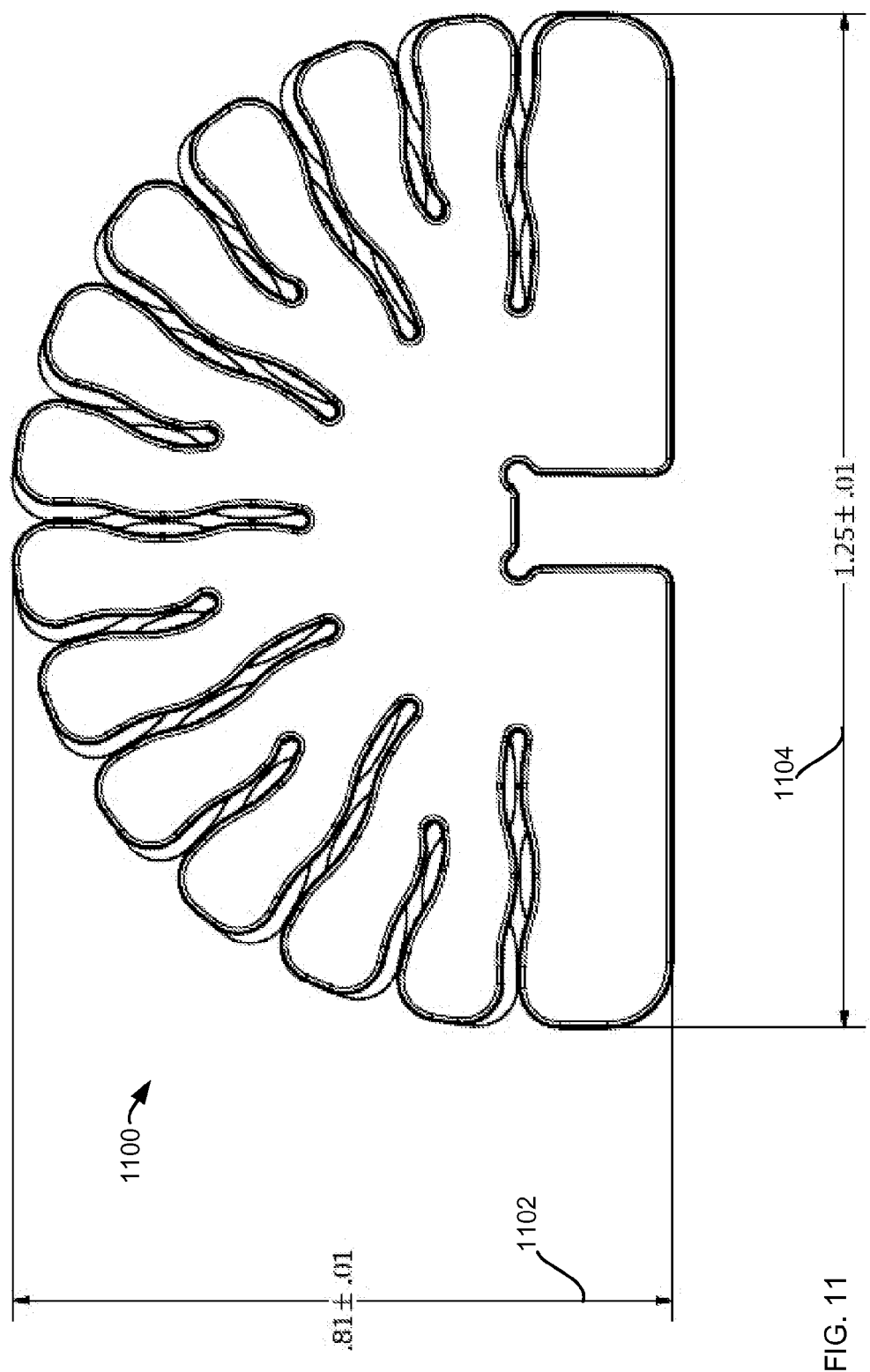
FIG. 11 illustrates a front view of a two-layer card-holding component in accordance with embodiments of the present invention.
Figure 12:
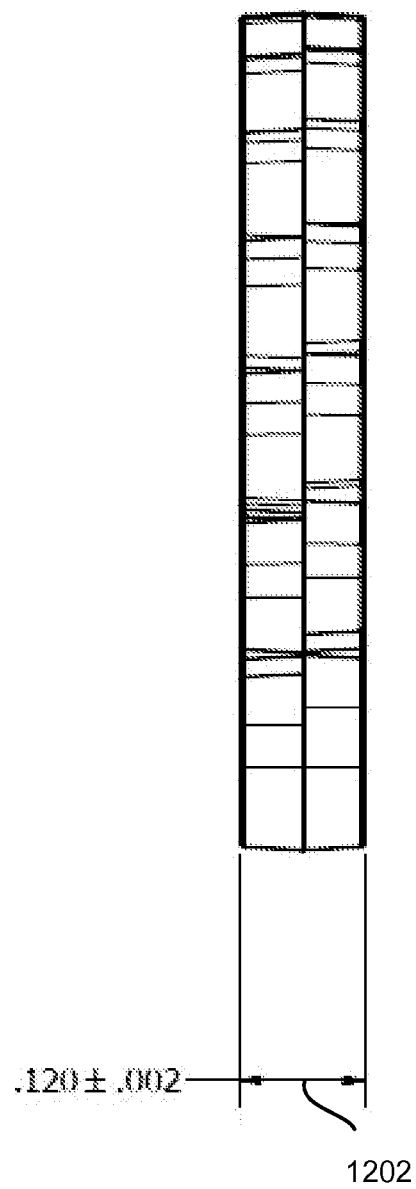
FIG. 12 illustrates a side view of a two-layer card-holding component in accordance with embodiments of the present invention.
Figure 13:
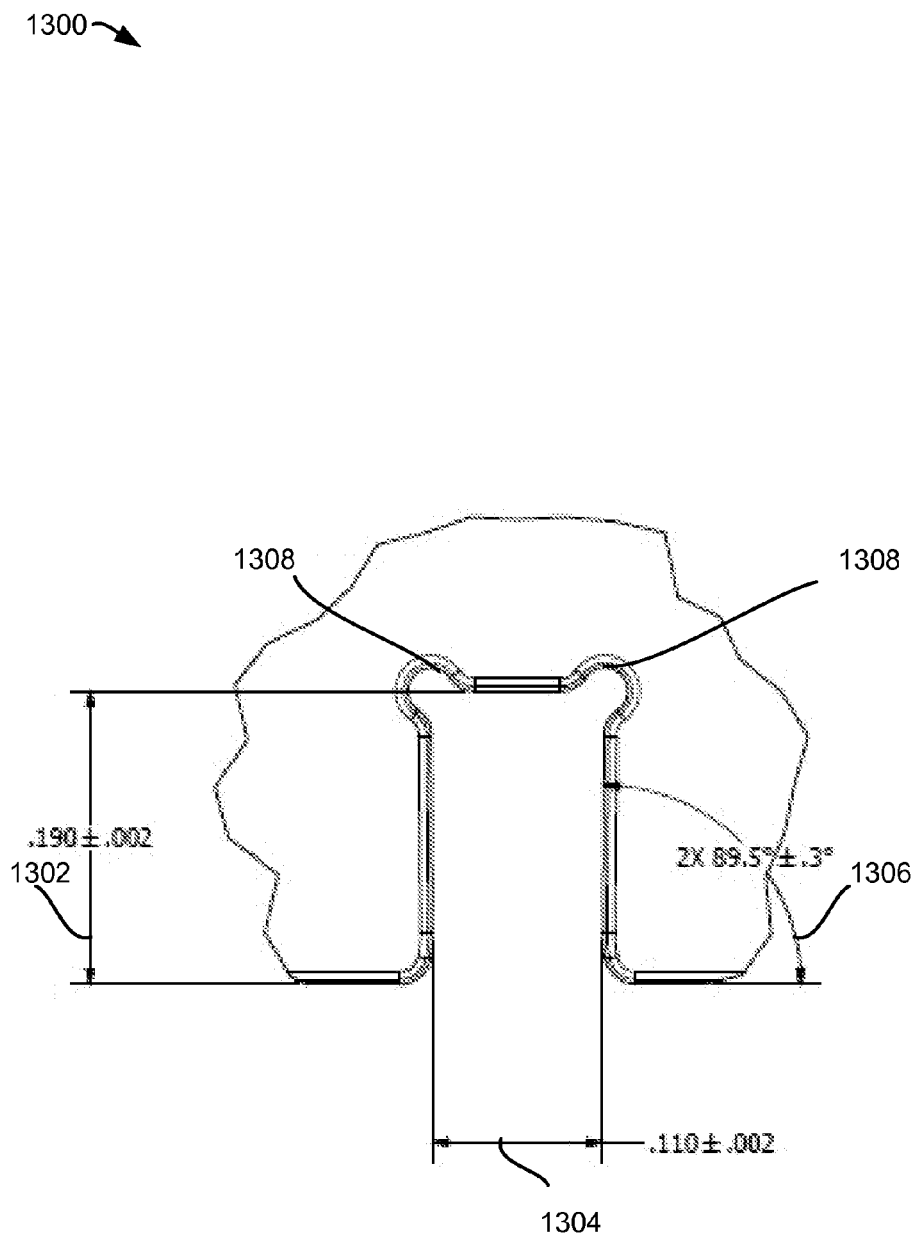
FIG. 13 illustrates a front view of a notch of a two-layer card-holding component in accordance with embodiments of the present invention.
Figure 14:
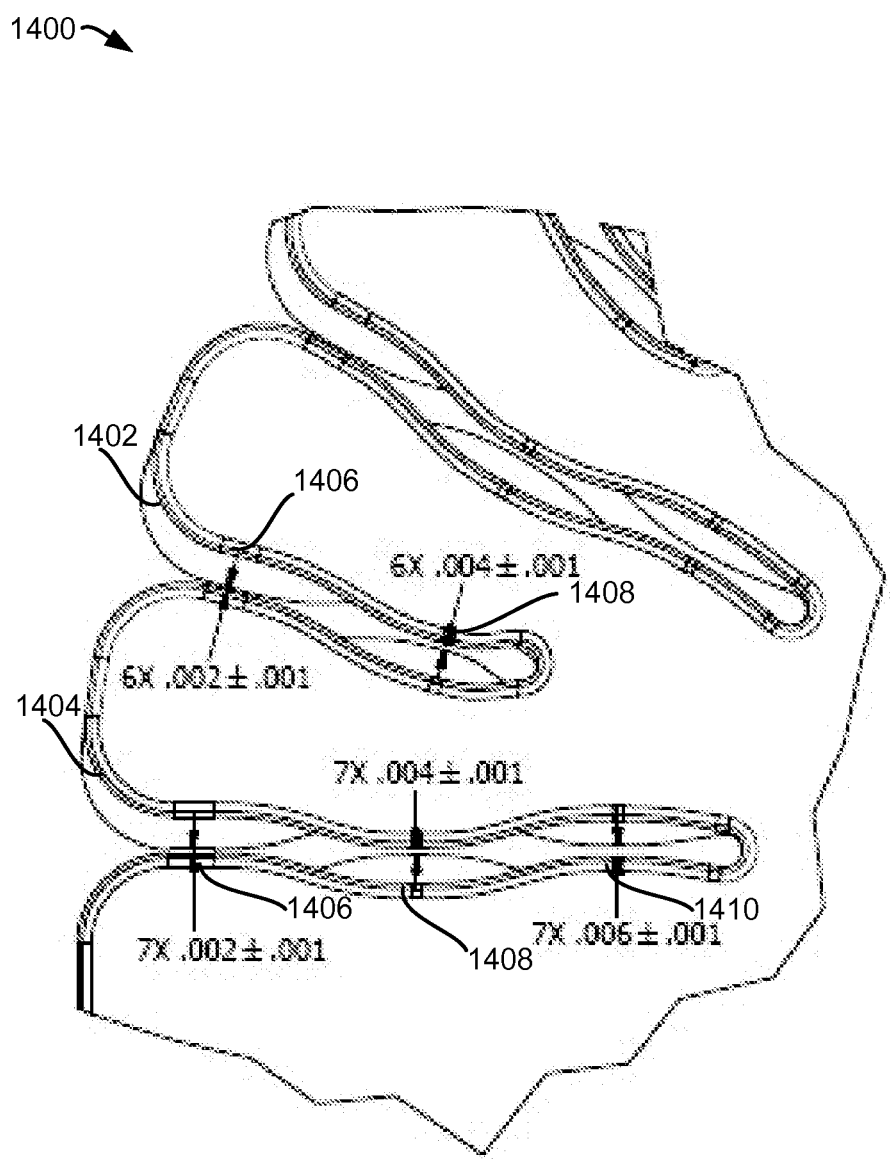
FIG. 14 illustrates a front view of slots of a two-layer card-holding component in accordance with embodiments of the present invention.

FIG. 11 illustrates a front view of a two-layer card-holding component 1100 in accordance with embodiments of the present invention. In particular, FIG. 11 illustrates dimensions of two-layer card-holding component 1100. As seen in FIG. 11, the height 1102 of two-layer card-holding component 1100 is 0.81 inches +/−0.01 inches. Additionally, the length 1104 of two-layer card-holding component 1100 is 1.25 inches +/−0.01 inches. Similarly, FIG. 12 illustrates a side view of a two-layer card-holding component 1200 in accordance with embodiments of the present invention. In particular, FIG. 12 illustrates that the depth 1202 of two-layer card-holding component 1200 is 0.12 inches +/−0.01 inches. Additionally, FIG. 13 illustrates a front view of a notch 1300 of a two-layer card-holding component having relief nodules 1308 at the corners in accordance with embodiments of the present invention. In particular, FIG. 13 illustrates dimensions showing a height 1302 of notch 1300 as 0.19 inches +/−0.002 inches, a width 1304 of notch 1300 of 0.110 inches +/−0.002 inches, and an arch 1306 of 89.5°+/−3°. Further, FIG. 14 illustrates a front view 1400 of slots 1402 and 1404 of a two-layer card-holding component in accordance with embodiments of the present invention. In particular, slots 1402 have two narrow gaps, a first gap 1406 having a width of 0.002 inches +/−0.001 inches and a second gap 1408 having a width of 0.004 inches +/−0.001 inches. Additionally, slots 1404 have three narrow gaps, a first gap 1406 0.002 inches +/−0.001 inches, a second gap 1408 having a width of 0.004 inches +/−0.001 inches, and a third gap 1410 having a width of 0.006 inches +/−0.001 inches.

As discussed here, the final assembly of the individual slot layers shall be referred to as a "3D compound slot." A 3D compound slot is formed when at least two discs having gaps are aligned to create a narrower slot. In particular, the resulting narrower slot may be unable to be formed using a direct injection molding process. One advantage 2D slots (such as sinusoidal and "toothed" slots) and 3D slots (such as the ones described in this document) have over simple linear slots is manufacturability, especially when the object to be gripped is quite thin. For example, in the process of injection molding, any negative space in the final product comes from a positive feature in the mold. These positive features may not be too thin or they will break off during the introduction of hot molten resin. Similarly, any linear slot in a machined part may only be as thin as the cutting tool. Thinner cutting tools are more expensive and more fragile. By using a 2D shape for the slot, the slot may be wider and grip the object at distinct points like teeth.

Furthermore, the compound 3D slot has several advantages over 2D slots. First of all, the stress vectors in the gripped object are not all coplanar. This keeps the gripped object from being able to bend in a 2D manner and conform to the curvature of the slot. Bending in this manner is undesirable because it weakens the grip between the two objects and may produce a permanent disfigurement of the gripped object. In addition, 3D compound slots may have opposing stress points very close to each other. This creates a greater proportion of shear stress to bending stress, which is useful because many thin objects are more resistant to shear than to bending.

In embodiments, a pair of slots is created in an injection-molded plastic part by leaving a sinusoidal boss in a bottom mold piece and an identical but mirror-image boss in a top mold piece. In this example, the mold will create a part with six "teeth" when injection molding is used to generate disc, such as those seen in FIG. 11. In this way, a playing card inserted in the slot may be gripped in three locations by alternating shear forces in different planes.

Figure 15:
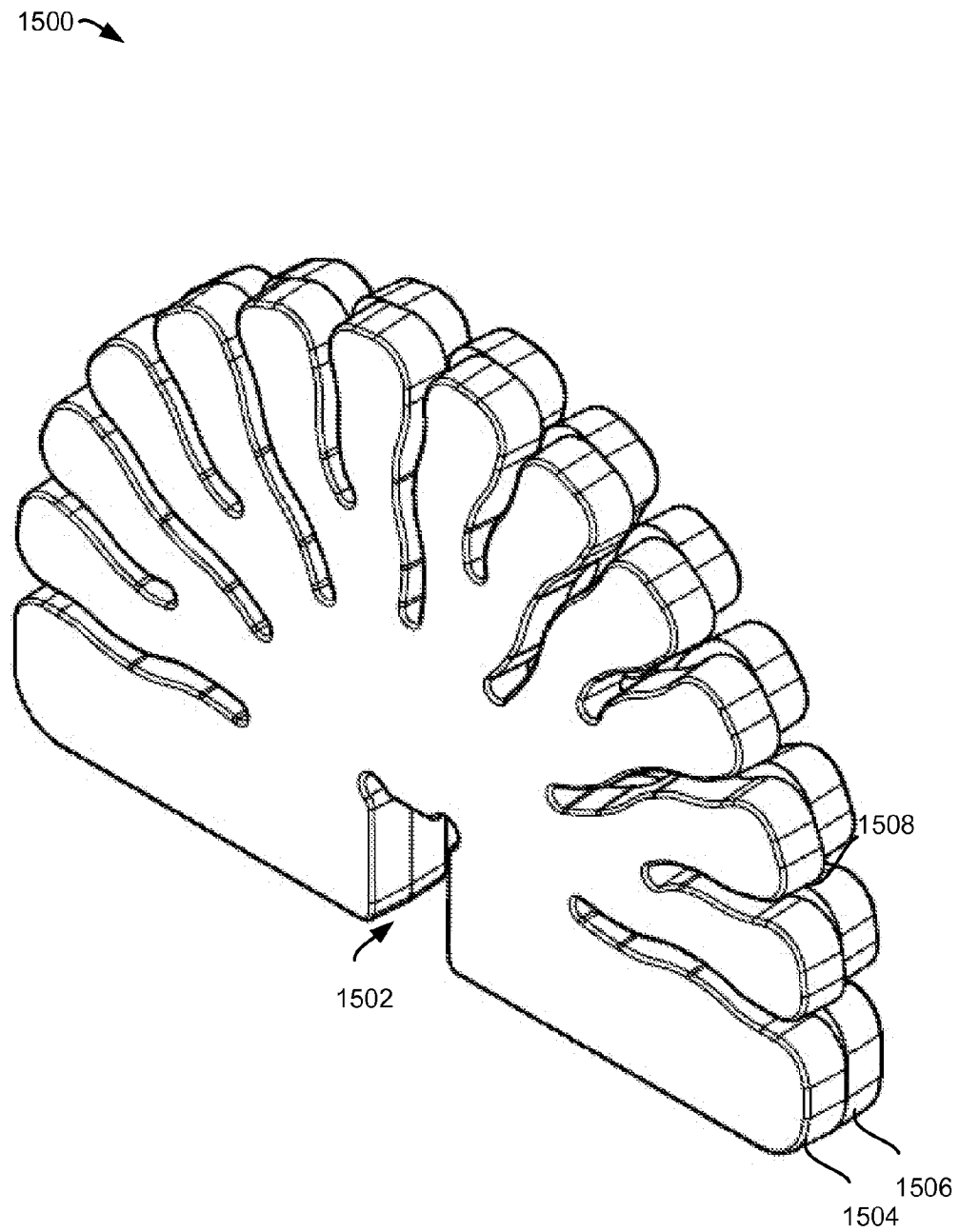
FIG. 15 illustrates a perspective view of a two-layer card-holding component in accordance with embodiments of the present invention.

The dimensions, shape, and number of pinch points of the compound slots may be adjusted to suit the intended application. As such, FIG. 15 illustrates a perspective view of a two-layer card-holding component 1500 in accordance with embodiments of the present invention. In particular, FIG. 15 illustrates two-layer card-holding component 1500 having notch 1502, first layer 1504, and second layer 1506. Further, first layer 1504 and second layer 1506 are aligned to form slots 1508.

Figure 16:
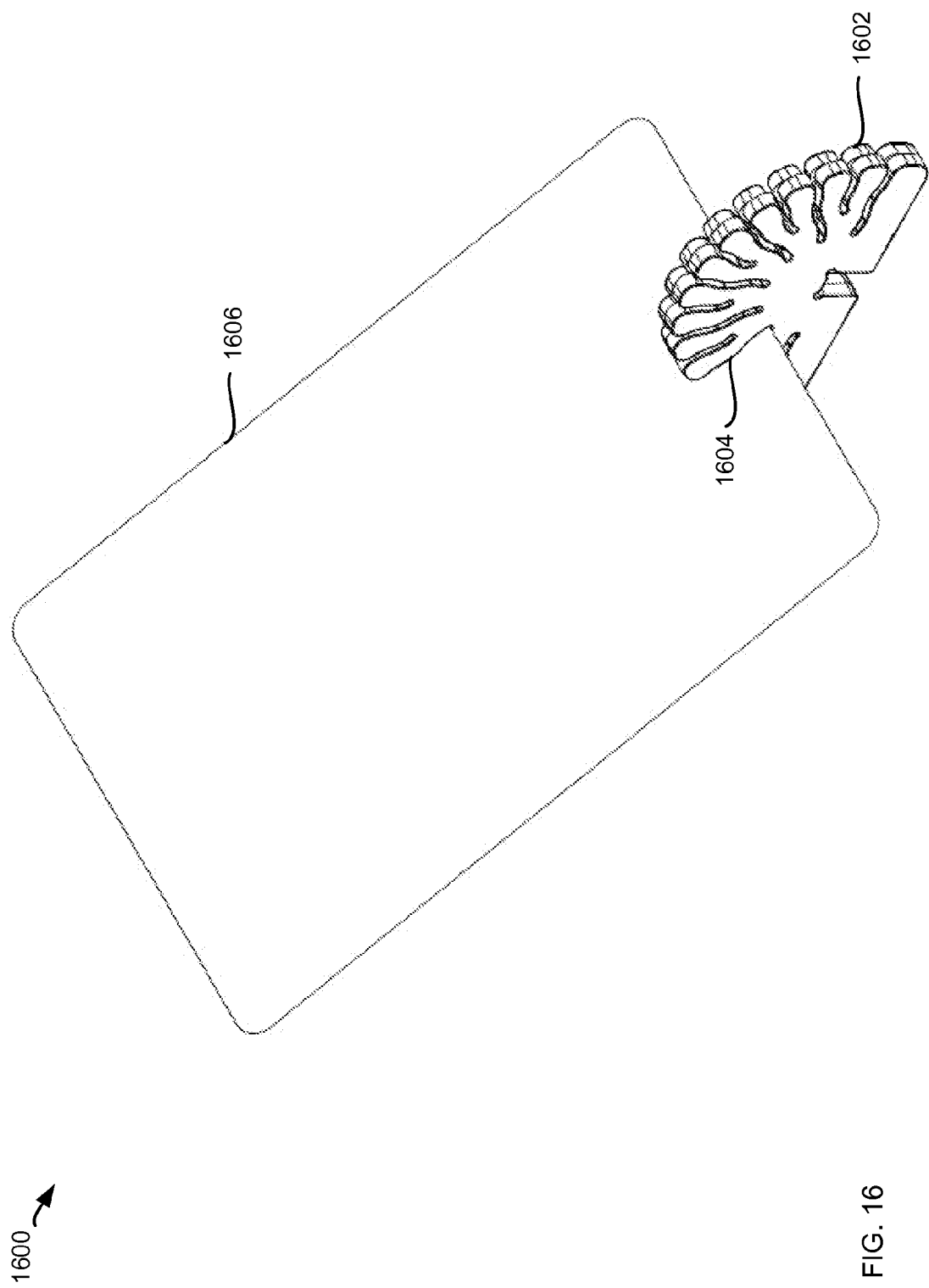
FIG. 16 illustrates a perspective view of a two-layer card-holding component engaging a card in accordance with embodiments of the present invention.

FIG. 16 illustrates a perspective view 1600 of a two-layer card-holding component 1602 engaging a card 1606 in accordance with embodiments of the present invention. In particular, card 1606 is engaged using slots 1604 of two-layer card-holding component 1602. Accordingly, FIG. 16 provides a two-layered card-holding component. The two-layered card-holding component 1602 comprises a two-layered main body that includes a base and a two-layered card-holding portion, wherein the two-layered card-holding portion has a geometry of a segment of a circle with an arcuate edge. A card-holding portion of a card-holding component may include the area of the card-holding component that includes slots. Additionally, card-holding component 1602 comprises a plurality of slots within the two-layered main body, each slot formed with curved portions of a first layer of the two-layered main body aligned with curved portions of a second layer of the two-layered main body to form a resultant straight slot. Further, two-layered card-holding component 1600 provides a coupling notch having a width that substantially matches a thickness of the main body.

In a further embodiment, a two-layered card-holding component is provided. In particular, the two-layered card-holding component comprises a two-layered main body that includes a two-layered card-holding portion having a semi-circular geometry with an arcuate peripheral edge and a generally rectangular base, the generally rectangular base having a side edge that faces away from the two-layered card-holding portion. Additionally, the two-layered card-holding component comprises a multiplicity of peripheral card-holding slots having a tapered portion, the slots arranged to open on the arcuate peripheral edge of the two-layered card-holding portion, the card-holding slots being radially spaced at 15 degree intervals to define leafs between the slots, each slot formed with curved portions of a first layer of the two-layered main body aligned with curved portions of a second layer of the two-layered main body to form a resultant straight slot.

Additionally, a first set of the slots have a first length and a second set of the slots have a second length that is shorter than the first length, and wherein none of the slots is adjacent to a slot of the same length. Further, each two-layered card-holding component comprises a coupling notch that extends through the side edge into the base.

In addition to embodiments described above, card-holding components may also have an additional feature to allow a first component (such as a card-holding component) and a second component (such as an axle) to slide or rotate with respect to each other in a way that creates the possibility for a desired mechanical motion. Further, a card-holding component may also serve as a spacing component by snapping into place with an axle that is without a bearing. The additional features that allow the motion of these components may also be used to create new structural configurations even if no motion is permitted.

Figure 17A:
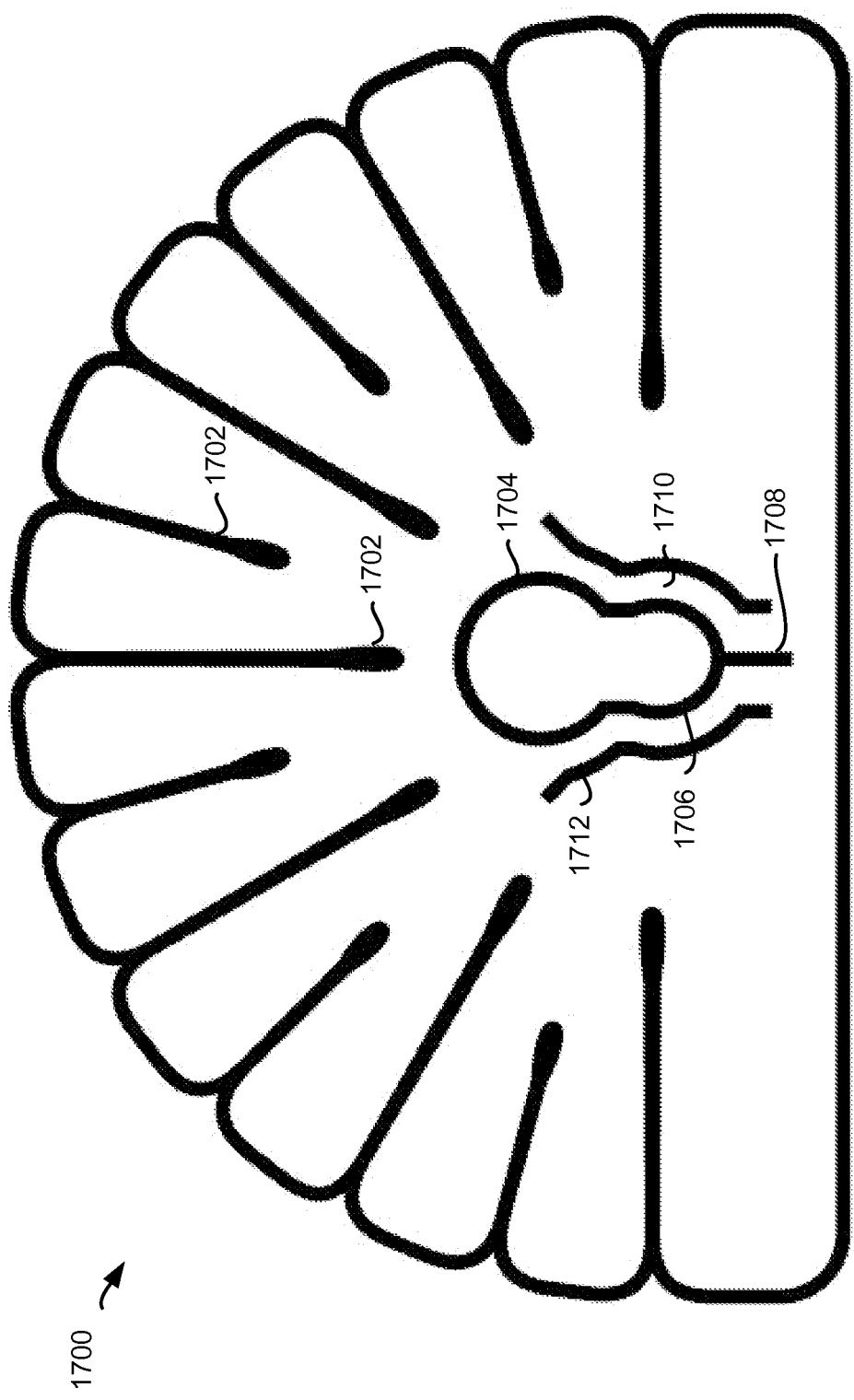
FIGS. 17A and 17B illustrate a front view and a perspective view, respectively, of a semi-circular kinetic card-holding component having a downwards-facing locking notch in accordance with embodiments of the present invention.
Figure 17B:
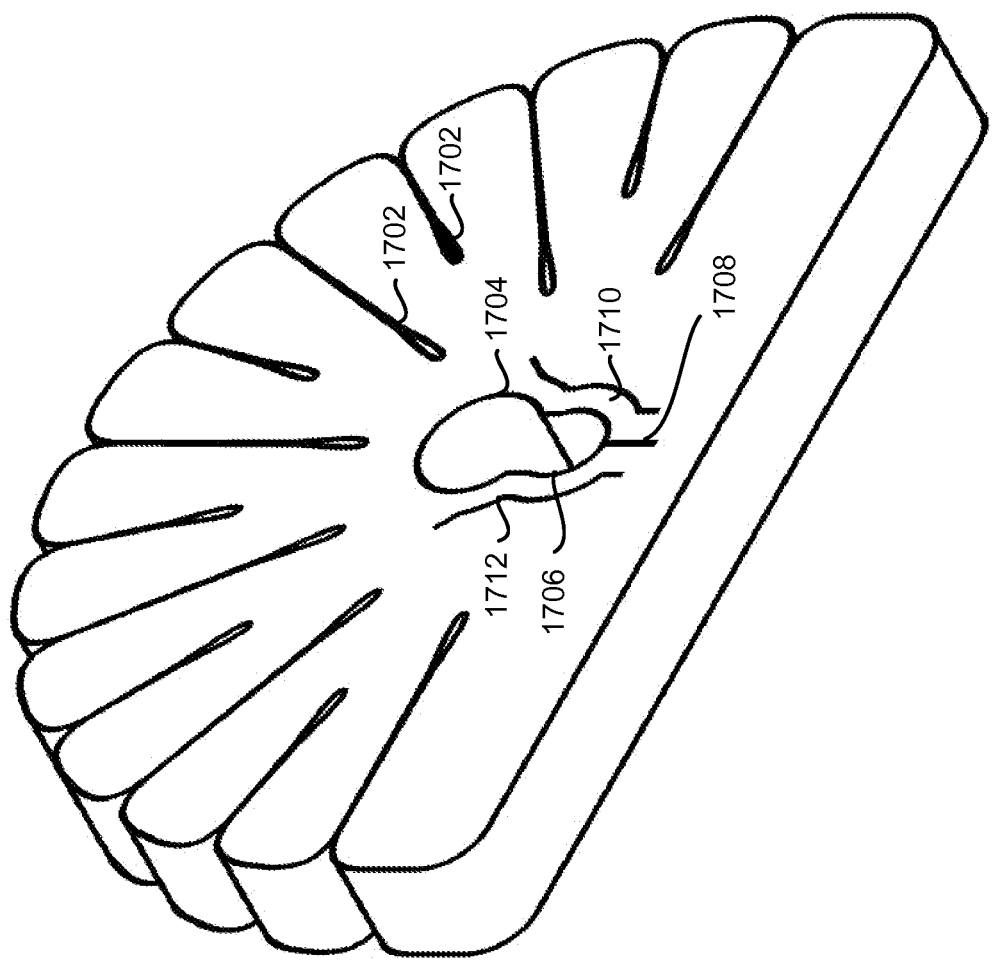

FIGS. 17A and 17B illustrate a front view and a perspective view, respectively, of a semi-circular kinetic card-holding component 1700 having a downward-facing locking notch in accordance with embodiments of the present invention. In particular, FIG. 17A comprises slots 1702, axle entry zone 1704, axle capture zone 1706, stress relief cut 1708, leaf springs 1710, and relief cuts 1712. Axle entry zone 1704 is designed to allow an axle to pass easily through before being pressed into axle capture zone 1706. When an axle is pressed into axle capture zone 1706, the form of axle capture zone 1706 is slightly enlarged. In particular, the border of axle capture zone 1706 comprises an edge of leaf springs 1710. As pressure accumulates at axle capture zone 1706, leaf springs 1710 extend into relief cuts 1712. Further, the expansion of axle capture zone 1706 allows continuous static pressure to be placed against a placed axle. In this way, the axle is semi-resistant to turning. In particular, the amount of static friction applied to a placed axle is variable based on the amount of distortion, and thus additional pressure, that results from placing an axle within axle capture zone 1706.

Figure 18A:
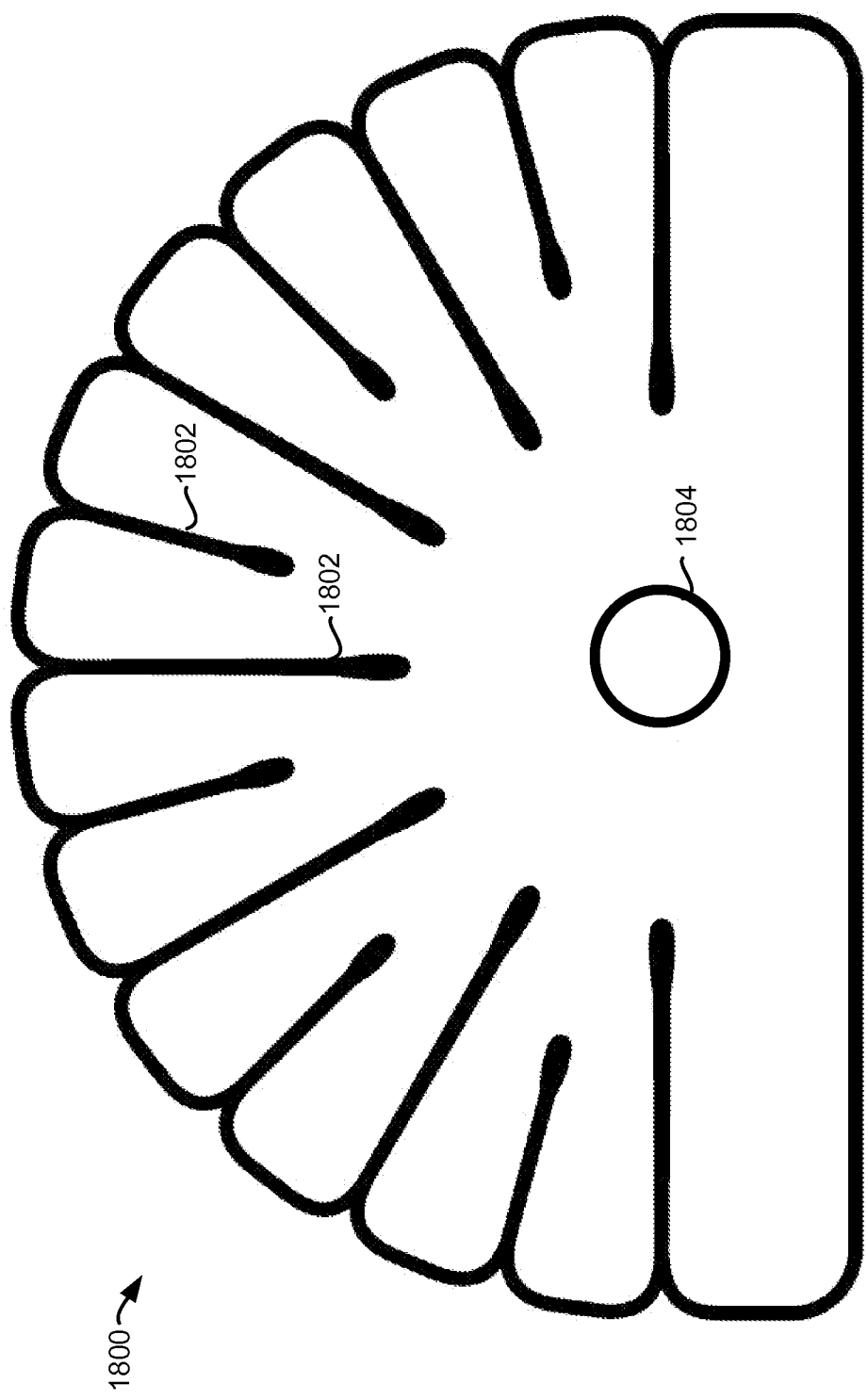

FIGS. 18A and 18B illustrate a front view and a perspective view, respectively, of a semi-circular kinetic card-holding component 1800 shaped having a circular hole in accordance with embodiments of the present invention. In particular, FIG. 18A comprises slots 1802 and circular hole 1804. Circular hole 1804 engages an axle with a slip fit. In this way, an axle that passes through circular hole 1804 may rotate freely.

Figure 19A:
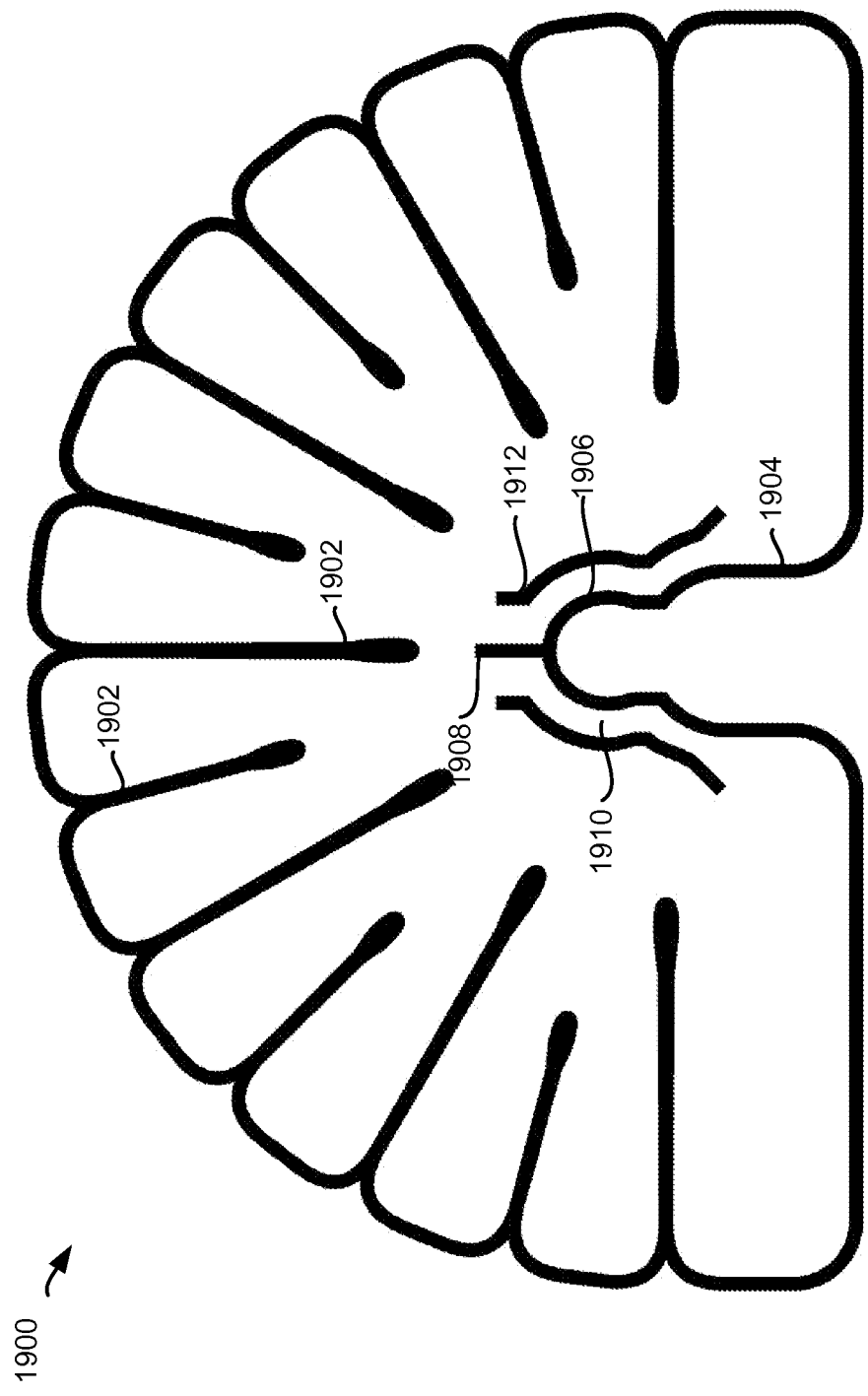
FIGS. 19A and 19B illustrate a front view and a perspective view, respectively, of a semi-circular kinetic card-holding component having an upwards-facing locking notch that opens to a base edge of the component in accordance with embodiments of the present invention.
Figure 19B:
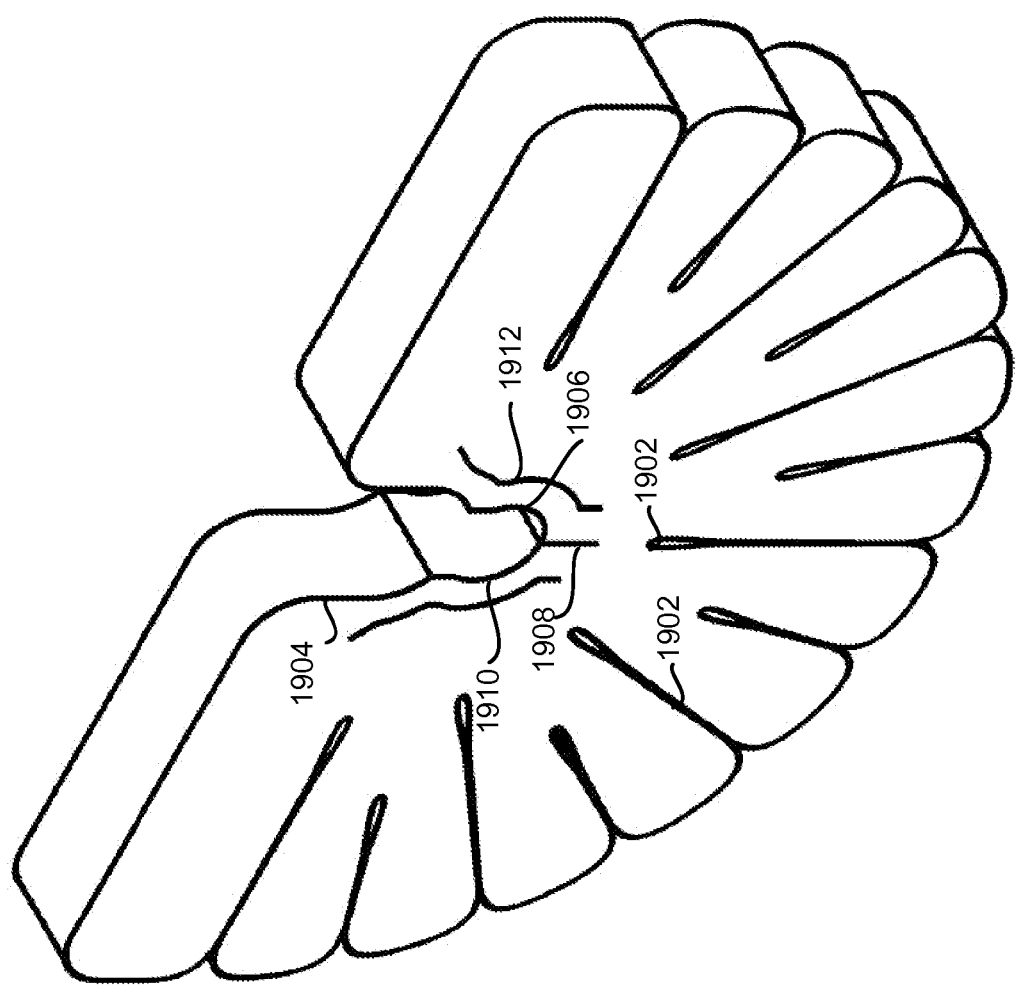

FIGS. 19A and 19B illustrate a front view and a perspective view, respectively, of a semi-circular kinetic card-holding component 1900 having an upwards-facing locking notch that opens to a base edge of the component in accordance with embodiments of the present invention. In particular, FIG. 19A comprises slots 1902, axle entry notch 1904, axle capture zone 1906, stress relief cut 1908, leaf springs 1910, and relief cuts 1912. Axle entry notch 1904 is designed to allow an axle to pass easily through the base of component 1900 before being pressed into axle capture zone 1906. As in FIG. 17, when an axle is pressed into axle capture zone 1906, part of the accumulated pressure is disseminated due to stress relief cut 1908 and the expansion of leaf springs 1910 into relief cuts 1912.

Figure 20A:
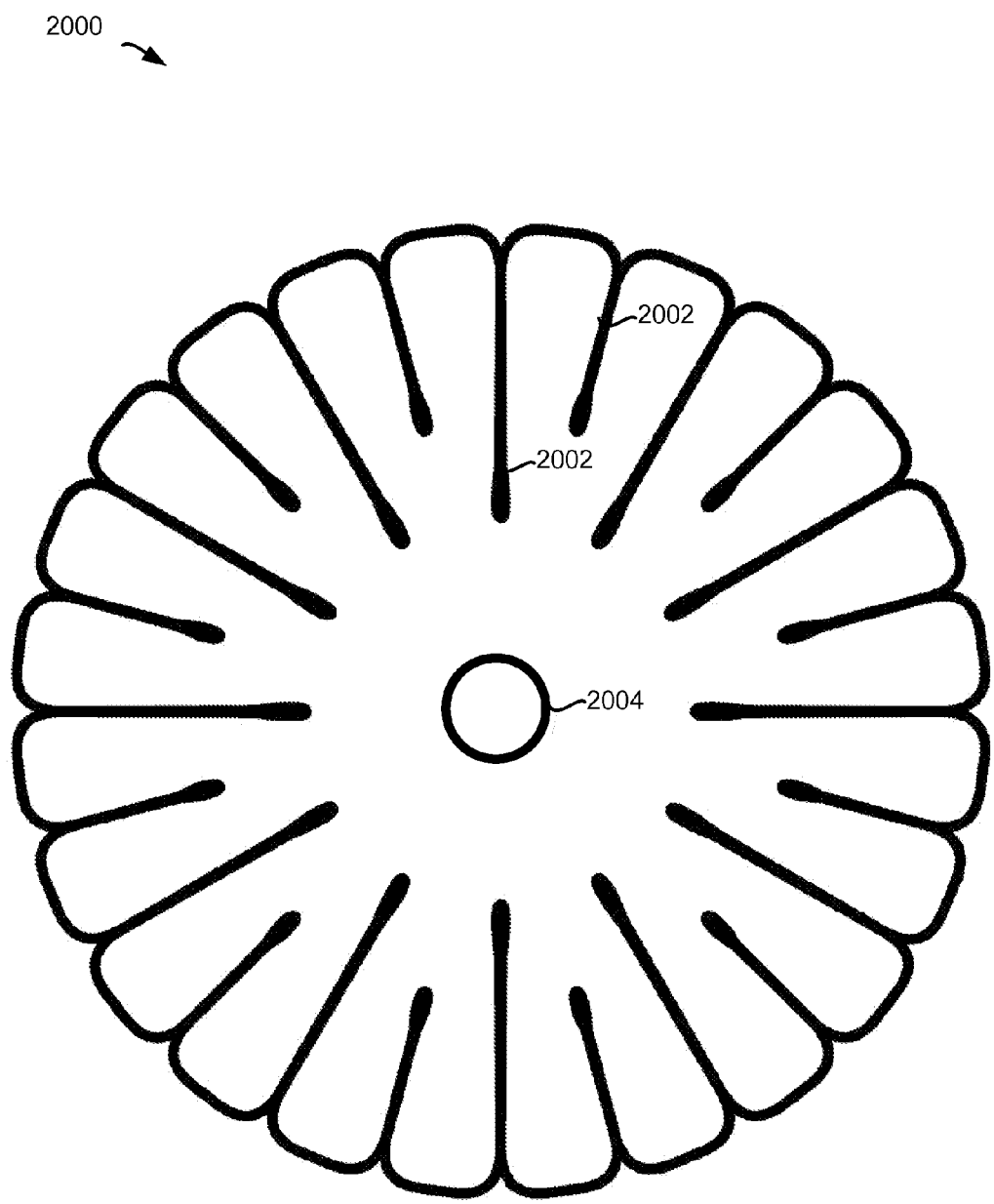
FIGS. 20A and 20B illustrate a front view and a perspective view, respectively, of a circular kinetic card-holding component shaped having a circular hole in accordance with embodiments of the present invention.
Figure 20B:
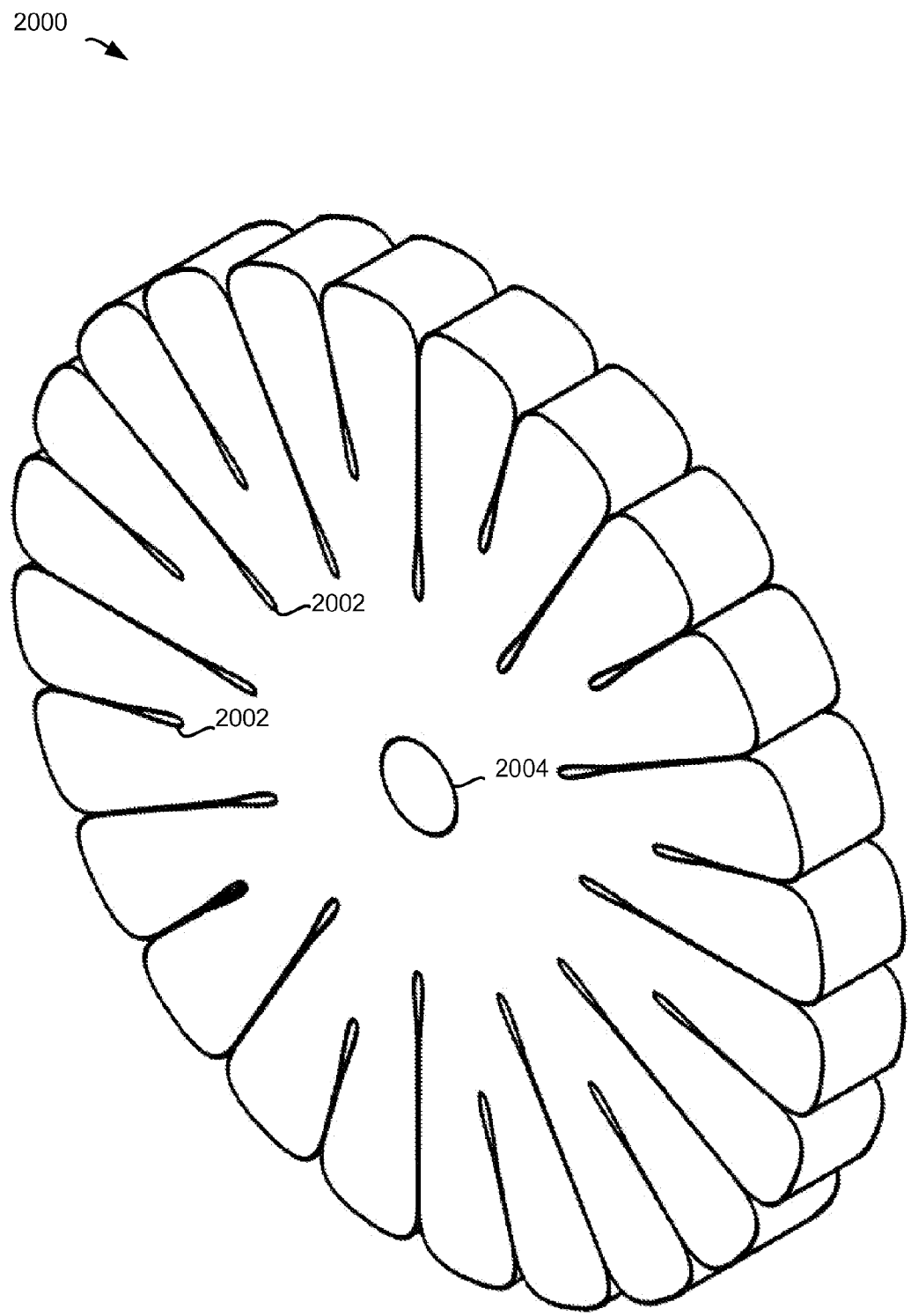

FIGS. 20A and 20B illustrate a front view and a perspective view, respectively, of a circular kinetic card-holding component 2000 shaped having a circular hole in accordance with embodiments of the present invention. In particular, FIG. 20A comprises slots 2002 and circular hole 2004. Circular hole 2004 engages an axle with a slip fit. In this way, an axle that passes through circular hole 2004 may rotate freely.

Figure 21A:
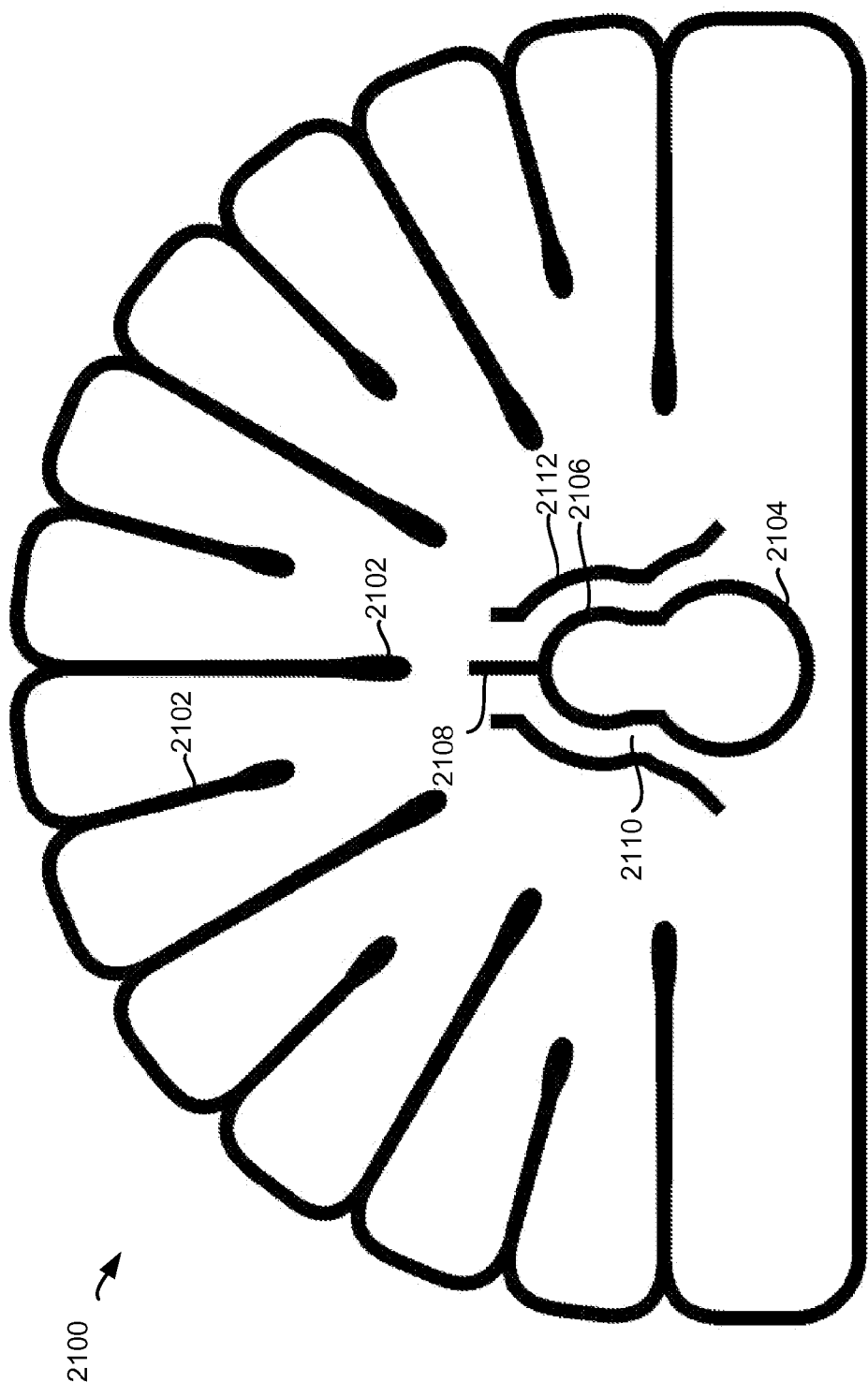
FIGS. 21A and 21B illustrate a front view and a perspective view, respectively, of a semi-circular kinetic card-holding component having an upwards-facing locking notch in accordance with embodiments of the present invention.
Figure 21B:
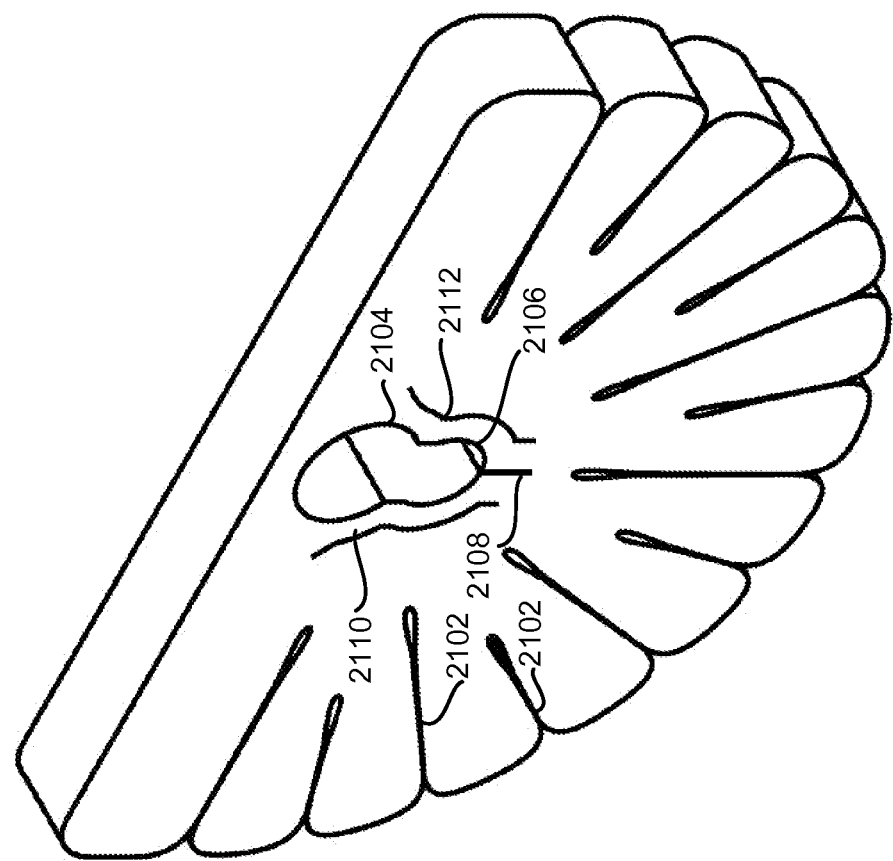

FIGS. 21A and 21B illustrate a front view and a perspective view, respectively, of a semi-circular kinetic card-holding component 2100 having an upwards-facing locking notch in accordance with embodiments of the present invention. In particular, FIG. 21A is similar to FIG. 17A, with the primary difference being the location of the axle engaging components. In particular, FIG. 21A comprises slots 2102, axle entry zone 2104, axle capture zone 2106, stress relief cut 2108, leaf springs 2110, and relief cuts 2112. Axle entry zone 2104 is designed to allow an axle to pass easily through before being pressed into axle capture zone 2106.

Figure 22A:
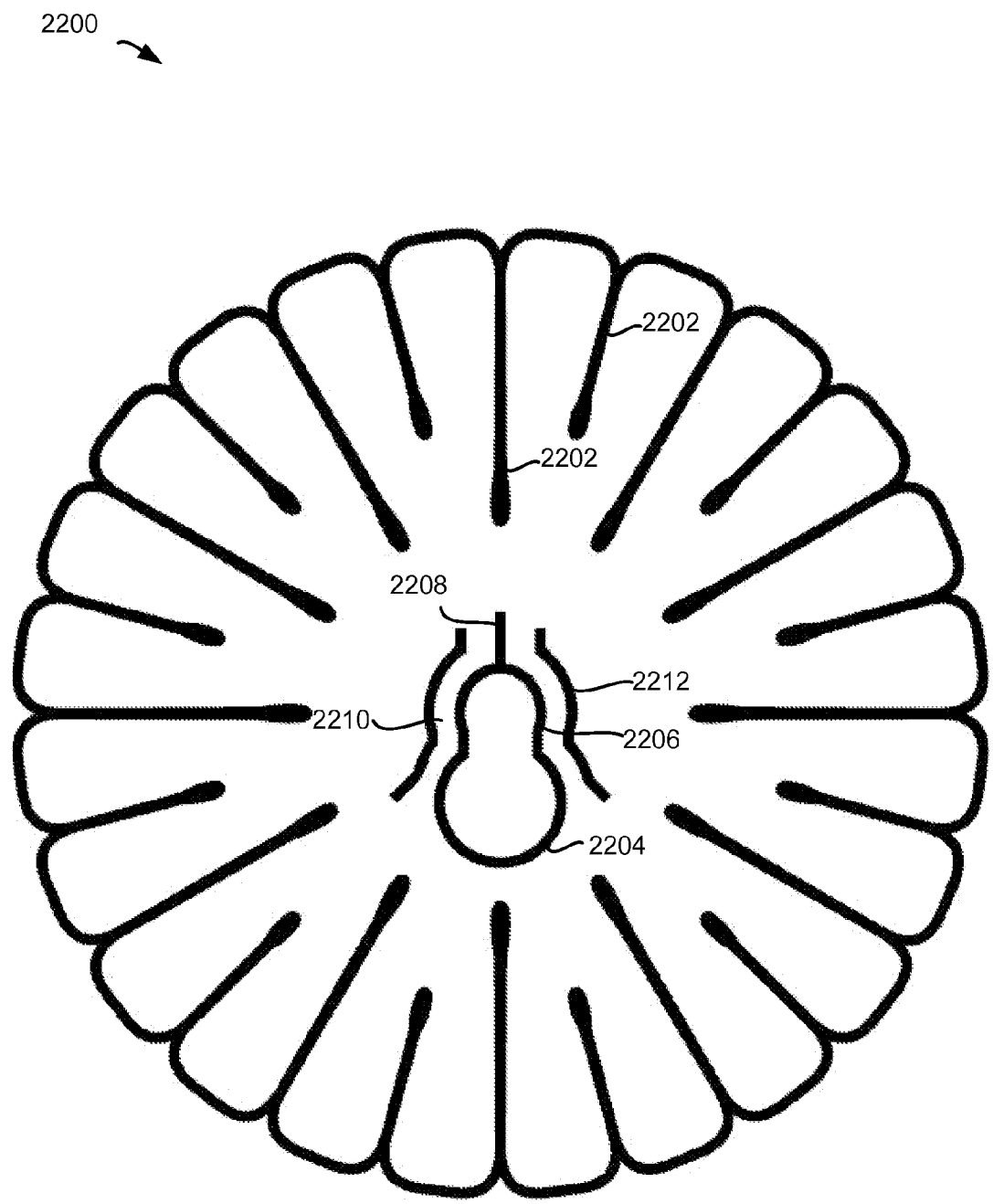
FIGS. 22A and 22B illustrate a front view and a perspective view, respectively, of a circular kinetic card-holding component having a locking in accordance with embodiments of the present invention.
Figure 22B:
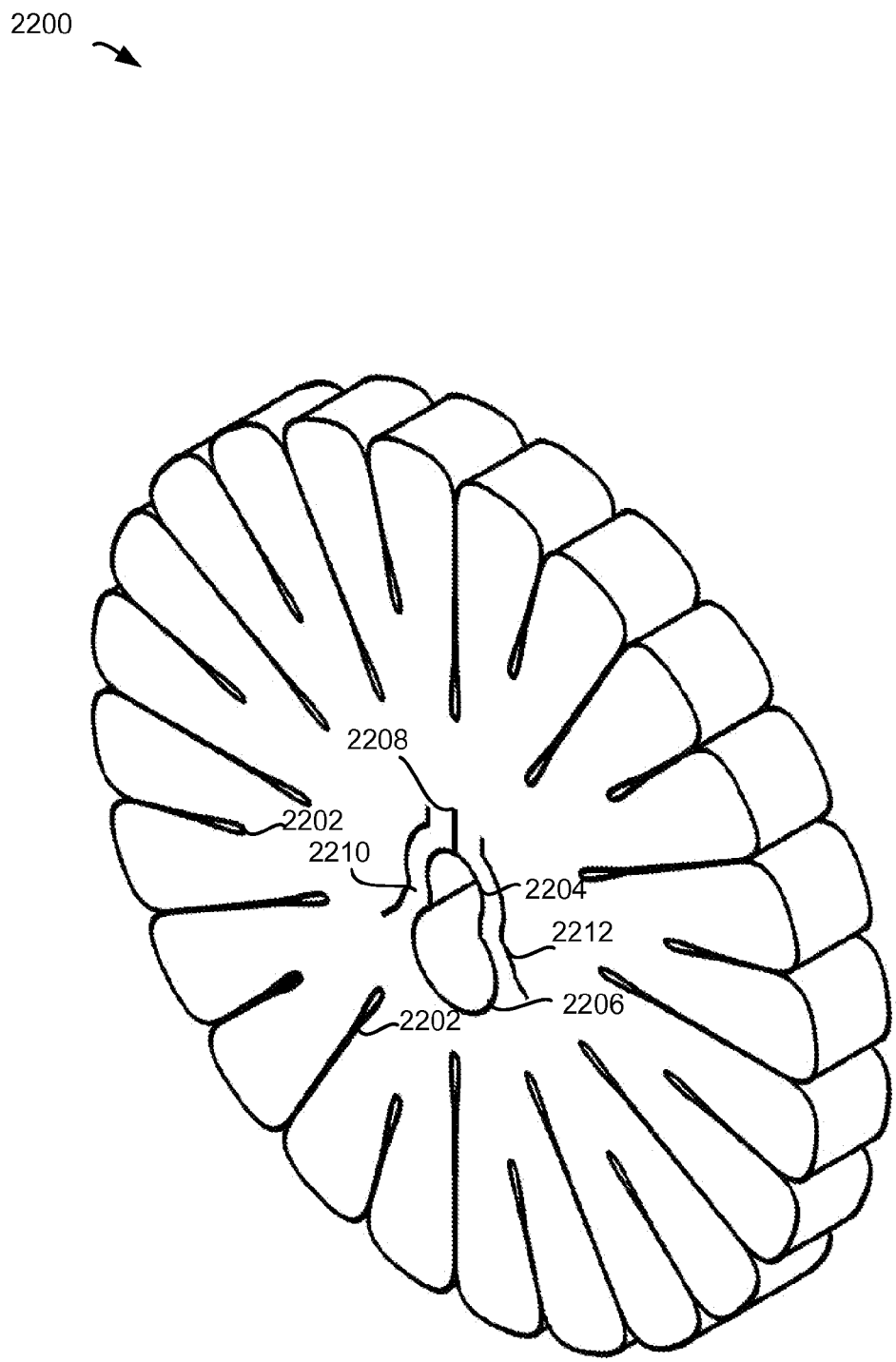

Additionally, FIGS. 22A and 22B illustrate a front view and a perspective view, respectively, of a circular kinetic card-holding component 2200 having a locking in accordance with embodiments of the present invention. FIG. 22A is similar to FIGS. 17A and 21A, the primary difference being the overall shape of the component. As such, FIG. 22A comprises slots 2202, axle entry zone 2204, axle capture zone 2206, stress relief cut 2208, leaf springs 2210, and relief cuts 2212. Axle entry zone 2204 is designed to allow an axle to pass easily through before being pressed into axle capture zone 2206.

Accordingly, FIGS. 17A-22B provide kinetic card-holding components. In particular, kinetic card-holding components include a main body that includes a base and a card-holding portion, wherein the card-holding portion has a geometry of a segment of a circle with an arcuate edge. Additionally, kinetic card-holding components include a multiplicity of peripheral slots arranged to open on the arcuate edge of the card-holding portion. Further, kinetic card-holding components include an attachment portion, such as an attachment notch, within the card-holding component. In particular, the attachment component may comprise either an axle capture zone, such as 1706 seen in FIG. 17, or a bearing hole, such as 1804 seen in FIG. 18. The attachment component enables a positioning rod, such as an axle, to be secured to the kinetic card-holding components.

Figure 23:
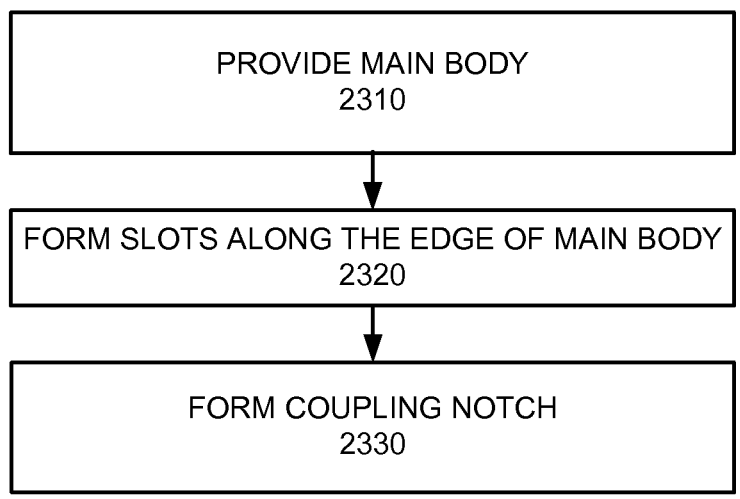
FIG. 23 illustrates a flow chart of a method of forming a card-holding component in accordance with embodiments of the present invention.

FIG. 23 illustrates a flow chart 2300 of a method of forming a card-holding component in accordance with embodiments of the present invention. At 2310, a main body is provided. In particular, the main body has an edge that extends from a first point to a second point. The main body may have a generally sharp-angled geometry. Alternatively, the main body may have a generally curved geometry. At 2320, slots are formed along the edge of the main body. Each slot extends from the edge of the main body towards the center of the main body. Additionally, at 2330, a coupling notch is formed within the main body, the coupling notch having a width that matches a thickness of the main body.

Figure 24:
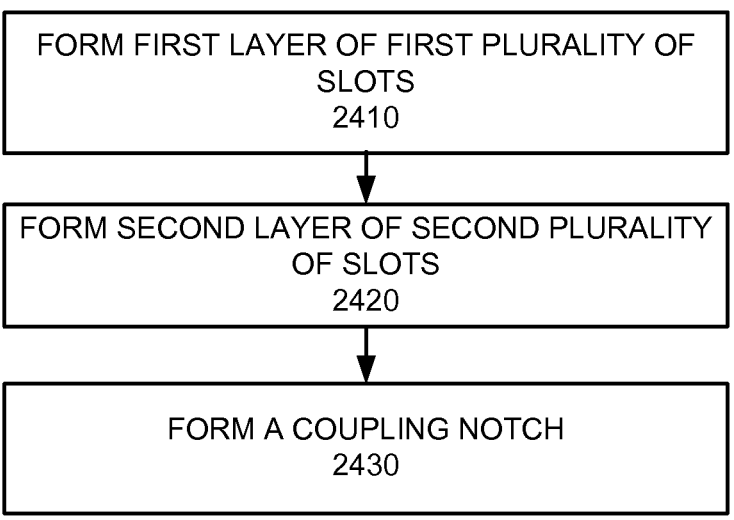
FIG. 24 illustrates a flow chart of a method of forming a two-disc card-holding component in accordance with embodiments of the present invention.

FIG. 24 illustrates a flow chart 2400 of a method of forming a two-disc card-holding component in accordance with embodiments of the present invention. At 2410, a first layer having a first plurality of slots is formed. At 2420, a second layer having a second plurality of slots is formed. The first layer and the second layer are aligned to form a two-layered card-holding component having a third plurality slots, each slot of the third plurality of slots having portions of the first plurality of slots and portions of the second plurality of slots, Further, the resultant third plurality of slots are narrower than the first plurality of slots and the second plurality of slots. Additionally, at 2430, a coupling notch is formed within the two-layered card-holding component. The coupling notch has a width that matches a width of the main body. In embodiments, each aspect of the card-holding component may be formed using injection molding. As such, in embodiments where card-holding components are formed using injection molding, each aspect of the card-holding component may be formed simultaneously.

Figure 25:
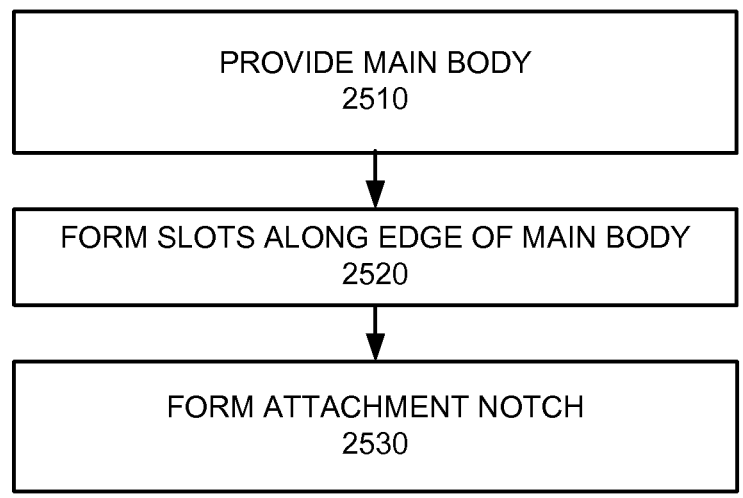
FIG. 25 illustrates a flow chart of a method of forming a kinetic card-holding component in accordance with embodiments of the present invention.

FIG. 25 illustrates a flow chart of a method of forming a kinetic card-holding component in accordance with embodiments of the present invention. At 2510, a main body is provided. In particular, the main body has an edge that extends from a first point to a second point. The main body may have a generally square geometry. Alternatively, the main body may have a generally spherical geometry. At 2520, slots are formed along the edge of the main body. Each slot extends from the edge of the main body towards the center of the main body. Additionally, at 2530, an attachment notch is formed within the main body, the attachment notch having a width that allows axles to engage with the kinetic card-holding components.

Figure 26:
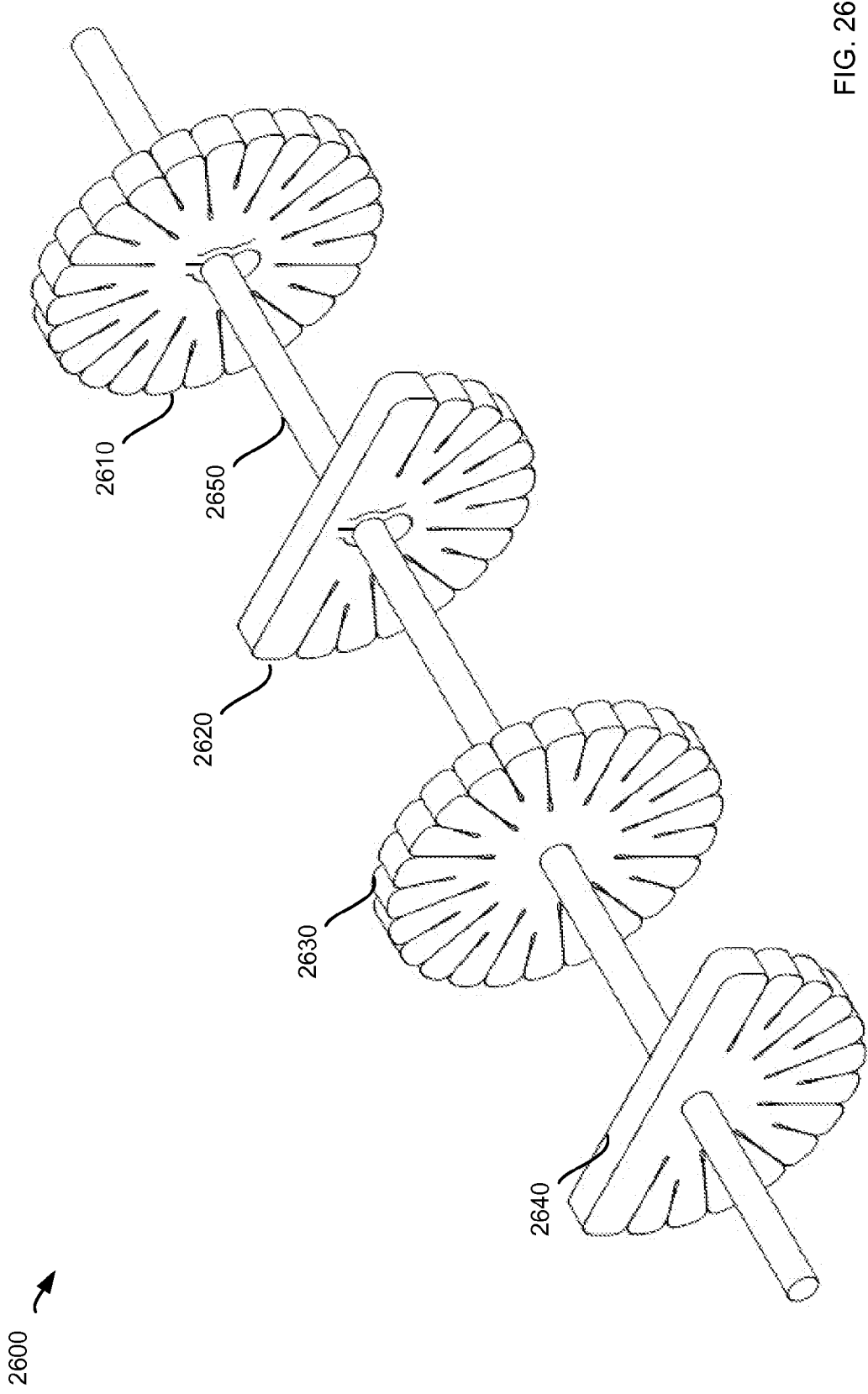
FIG. 26 illustrates a view of kinetic card-holding components engaged along an axle in accordance with embodiments of the present invention.

FIG. 26 illustrates a view 2600 of kinetic card-holding components engaged along an axle in accordance with embodiments of the present invention. In particular, FIG. 26 comprises axle 2610 as it engages with circle lock kinetic card-holding component 2620, down lock kinetic card-holding component 2630, circle kinetic card-holding component 2640, and semi-circle kinetic card-holding component 2650. In particular, axle 2610 engages with the axle capture zones of components 2620 and 2603, and axle 2610 engages with the bearing hole of components 2640 and 2650.

While this invention has been described in terms of several preferred embodiments, there are alterations, permutations, and substitute equivalents, which fall within the scope of this invention. It should also be noted that there are many alternative ways of implementing the methods and apparatuses of the present invention. It is therefore intended that the following appended claims be interpreted as including all such alterations, permutations, and substitute equivalents as fall within the true spirit and scope of the present invention.

What is claimed is:

1. A card-holding component, comprising:
   a main body that includes a base and a card-holding portion, the card-holding portion having a geometry of a segment of a circle with an arcuate edge, wherein the main body comprises a first layer attached to a second layer;
   a multiplicity of peripheral slots with the first layer attached to the second layere, the multiplicity of peripheral slots arranged to open on the arcuate edge of the card-holding portion, wherein a narrowest point of each of the multiplicity of peripheral slots is narrower than a narrowest point of each slot of the first layer and of each slot of the second layer; and
   a coupling notch having a width that substantially matches a thickness of the main body.

2. The card-holding component of claim 1, wherein the main body has a constant width.

3. The card-holding component of claim 1, wherein the base of the main body is straight.

4. The card-holding component of claim 1, wherein the coupling notch lies along the base.

5. The card-holding component of claim 1, wherein the coupling notch has relief nodules at corners of the coupling notch.

6. The card-holding component of claim 1, wherein the multiplicity of peripheral slots are evenly spaced across the card-holding portion.

7. The card-holding component of claim 1, wherein each of the multiplicity of peripheral slots is designed to accommodate a card having a width of 0.01+/−0.005 inches.

8. The card-holding component of claim 1, wherein each of the multiplicity of peripheral slots has a narrowest point of 0.002 inches.

9. The card-holding component of claim 8, wherein each slot of the first layer and the second layer has a narrowest point of about 0.02-0.03 inch.

10. The card-holding component of claim 1, wherein each of the multiplicity of peripheral slots has a rounded bottom.

11. The card-holding component of claim 10, wherein each of the multiplicity of peripheral slots tapers inwardly from the rounded bottom to a narrowest point of the slot.

12. The card-holding component of claim 1, wherein each of the multiplicity of peripheral slots tapers outwardly from a narrowest point of the slot to the arcuate edge.

13. The card-holding component of claim 1, wherein each of the first and second layers is formed of plastic.

14. A card-holding component, comprising:
    a main body that includes a card-holding portion having a semi-circular geometry with an arcuate peripheral edge and a generally rectangular base, the generally rectangular base having a side edge that faces away from the card holding portion, wherein the main body comprises a first layer attached to a second layer;
    a multiplicity of peripheral card-holding slots in the main body, each slot having a tapered portion, the slots arranged to open on the arcuate peripheral edge of the card-holding portion, the card-holding slots being radially spaced at 15 degree intervals to define leafs between the slots, wherein each leaf is displaced into a space that forms a neighboring slot when a card is placed in a card-holding slot that defines the leaf, wherein a first set of the slots have a first length and a second set of the slots have a second length that is shorter than the first length, and wherein none of the slots is adjacent to a slot of the same length, wherein a narrowest point of each of the multiplicity of peripheral card-holding slots is narrower than a narrowest point of each slot of the first layer and of each slot of the second layer; and
    a coupling notch that extends through the side edge into the base.

15. The card-holding component of claim 14, wherein the coupling notch attaches to a coupling notch of a similarly-sized card-holding component.

16. The card-holding component of claim 14, wherein the coupling notch attaches to the card-holding portion of a similarly-sized card-holding component.

17. The card-holding component of claim 14, wherein each of the multiplicity of peripheral card-holding slots has rounded edges at the opening on the arcuate peripheral edge.

18. The card-holding component of claim 14, wherein each of the multiplicity of card-holding peripheral slots has a narrowest point of about 0.002 inch.

19. The card-holding component of claim 18, wherein each slot of the first layer and the second layer has a narrowest point of about 0.02-0.03 inch.

20. The card-holding component of claim 14, wherein each of the first and second layers is formed of plastic.

* * * * *